United States Patent
Gutierrez et al.

(10) Patent No.: US 11,345,342 B2
(45) Date of Patent: May 31, 2022

(54) POTENTIAL COLLISION WARNING SYSTEM BASED ON ROAD USER INTENT PREDICTION

(71) Applicant: Intel Corporation, Santa Clara, CA (US)

(72) Inventors: David Gomez Gutierrez, Jalisco (MX); Javier Felip Leon, Hillsboro, OR (US); Kshitij A. Doshi, Tempe, AZ (US); Leobardo E. Campos Macias, Jalisco (MX); Nilesh Amar Ahuja, Cupertino, CA (US); Omesh Tickoo, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 222 days.

(21) Appl. No.: 16/586,665

(22) Filed: Sep. 27, 2019

(65) Prior Publication Data

US 2020/0023842 A1  Jan. 23, 2020

(51) Int. Cl.
*B60W 30/095* (2012.01)
*B60W 50/14* (2020.01)
(Continued)

(52) U.S. Cl.
CPC ........ *B60W 30/0956* (2013.01); *B60W 50/14* (2013.01); *G06V 20/58* (2022.01);
(Continued)

(58) Field of Classification Search
CPC ......... B60W 30/0956; B60W 2554/00; B60W 2050/146; G06K 9/00362; G06K 9/00805
See application file for complete search history.

(56) References Cited

U.S. PATENT DOCUMENTS 9,248,834 B1 *  2/2016  Ferguson .............. G05D 1/0088
2016/0300485 A1 * 10/2016  Ayvaci .................. G08G 1/166
(Continued)

FOREIGN PATENT DOCUMENTS

CN        107798346 A  *  3/2018  .......... G06K 9/6215

OTHER PUBLICATIONS

Karaman et al, "Incremental Sampling-based Algorithms for Optimal Motion Planning", 2010, Pages whole document (Year: 2010).*
(Continued)

*Primary Examiner* — Peter D Nolan
*Assistant Examiner* — Kenneth M Dunne
(74) *Attorney, Agent, or Firm* — Alliance IP, LLC

(57) ABSTRACT

An apparatus comprising a memory to store an observed trajectory of a pedestrian, the observed trajectory comprising a plurality of observed locations of the pedestrian over a first plurality of timesteps; and a processor to generate a predicted trajectory of the pedestrian, the predicted trajectory comprising a plurality of predicted locations of the pedestrian over the first plurality of timesteps and over a second plurality of timesteps occurring after the first plurality of timesteps; determine a likelihood of the predicted trajectory based on a comparison of the plurality of predicted locations of the pedestrian over the first plurality of timesteps and the plurality of observed locations of the pedestrian over the first plurality of timesteps; and responsive to the determined likelihood of the predicted trajectory, provide information associated with the predicted trajectory to a vehicle to warn the vehicle of a potential collision with the pedestrian.

21 Claims, 17 Drawing Sheets

(51) Int. Cl.
G06V 20/58 (2022.01)
G06V 40/10 (2022.01)
(52) U.S. Cl.
CPC .......... G06V 20/584 (2022.01); G06V 40/10 (2022.01); B60W 2050/146 (2013.01); B60W 2554/00 (2020.02)

(56) References Cited

U.S. PATENT DOCUMENTS

| | | | | |
|---|---|---|---|---|
| 2016/0364472 | A1* | 12/2016 | Bak | G06F 16/287 |
| 2019/0132709 | A1* | 5/2019 | Graefe | H04W 4/38 |
| 2019/0310632 | A1* | 10/2019 | Nakhaei Sarvedani | G06N 3/006 |
| 2019/0367021 | A1* | 12/2019 | Zhao | B60W 60/00274 |
| 2020/0133261 | A1* | 4/2020 | Tao | G06F 21/32 |
| 2020/0148201 | A1* | 5/2020 | King | G06N 7/005 |
| 2020/0379461 | A1* | 12/2020 | Singh | B60W 60/00276 |
| 2021/0027629 | A1* | 1/2021 | Tao | G08G 1/052 |
| 2021/0233406 | A1* | 7/2021 | Lu | G06V 40/10 |
| 2022/0011123 | A1* | 1/2022 | Gonzalez De Cossio Echeverria | G01C 21/3423 |

OTHER PUBLICATIONS

Alahi, Alexandre, et al.; "Social LTSM: Human Trajectory Prediction in Crowded Spaces," 2016 IEEE Conference on Computer Vision and Pattern Recognition (CVPR), 2016; 11 pages.
Baker, Chris, et al.; "Action Understanding as Inverse Planning," accessed at http://dx.doi.org/10.1016/j.cognition.2009.07.005; Dec. 2009; 37 pages.
Campos-Macias, Leobardo, et al.; "A Hybrid Method for Online Trajectory Planning of Mobile Robots in Cluttered Environments," IEEE Robotics and Automation Letters, vol. 2, No. 2; Apr. 2017; 8 pages.
Cao, Zhe, et al.; "OpenPose: Realtime Multi-Person 2D Pose Estimation using Part Affinity Fields," IEEE Transactions on Pattern Analysis and Machine Intelligence, Dec. 2018; 14 pages.
Cusumano-Towner, Marco, et al.; "Probabilistic programs for inferring the goals of autonomous agents," Apr. 2017; 15 pages.
Fang, Zhijie, et al.; "On-Board Detection of Pedestrian Intentions," www.mdpi.com/journal/sensors; Sep. 23, 2017; 14 pages.
Felip, Javier, et al.; "Real-time Approximate Bayesian Computation for Scene Understanding," May 22, 2019; 15 pages.
Gammell, Jonathan, et al.; "Informed RRT*: Optimal Sampling-based Path Planning Focused via Direct Sampling of an Admissible Ellipsoidal Heuristic," IEEE International Conference on Intelligent Robotics Systems; 2014; 8 pages.
Gandhi, Tarak, et al.; "Pedestrian Protection Systems: Issues, Survey, and Challenges," IEEE Transactions on Intelligent Transportation Systems, vol. 8, No. 3; Sep. 2007; 18 pages.
Helbing, Dirk, et al.; "Social force model for pedestrian dynamics," May 20, 1998; 18 pages.
Hsu, David, et al.; "Randomized Kinodynamic Motion Planning with Moving Obstacles," International Journal of Robotics Research, vol. 21, No. 3; Mar. 2002; 23 pages.
Karasev, Vasiliy, et al.; "Intent-Aware Long-Term Prediction of Pedestrian Motion," 2016 IEEE International Conference on Robotics and Automation (ICRA), 2016 7 pages.
Lavalle, Steven, et al.; "Randomized Kinodynamic Planning," International Journal of Robotics Research, vol. 20, No. 5; May 2001; 23 pages.
Mombaur, Katja, et al.; "From human to humanoid locomotion—an inverse optimal control approach," Autonomous Robots, vol. 28, No. 3; Apr. 2010; 15 pages.
Rasouli, Amir, et al.; "Are They Going to Cross? A Benchmark Dataset and Baseline for Pedestrian Crosswalk Behavior," 2017 IEEE International Conference on Computer Vision Workshops (ICCVW), 2017; 8 pages.
Shiarlis, Kyriacos, et al.; "Rapidly Exploring Learning Trees," IEEE International Conference on Robotics and Automation (ICRA), 2017; 8 pages.
Strigel, Elias, et al.; "The Ko-PER Intersection Laserscanner and Video Dataset," 17th International IEEE Conference on Intelligent Transportation Systems (ITSC); Oct. 2014; 2 pages.
Van Den Berg, J.P., et al.; "Roadmap-based Motion Planning in Dynamic Environments," IEEE Transportation Robotics, vol. 21, No. 5; Oct. 2005; 21 pages.

* cited by examiner

POTENTIAL COLLISION WARNING SYSTEM BASED ON ROAD USER INTENT PREDICTION

TECHNICAL FIELD

This disclosure relates in general to the field of computing systems and, more particularly, to a potential collision warning system based on road user intent prediction.

BACKGROUND

Pedestrians on foot, bicyclists, and drivers and riders of other small vehicles such as scooters (this demographic may be collectively referred to herein as "road users") make up a large portion of the worldwide deaths due to traffic accidents. This presents a big challenge to the full adoption of autonomous vehicles (AVs), since AVs should be capable of effectively coexisting with other traffic by inferring the intentions of the other traffic and planning accordingly.

BRIEF DESCRIPTION OF THE DRAWINGS

Like reference numbers and designations in the various drawings indicate like elements.

DESCRIPTION OF EXAMPLE EMBODIMENTS

Most pedestrian protection systems are based on pedestrian detection and short term collision detection. Although some systems may be effective in considering the interaction of different users, they do not exploit context (such as changes in the environment, state of traffic lights, etc.) while maintaining real-time execution. Consequently, most non-context-aware methods only perform short term (e.g., less than 1 second) crossing intent prediction (e.g., based on the pose of the pedestrians). Planning methods have shown to be effective in action understanding. However, existing methods for trajectory planning on dynamic environments are not suitable for real-time inference, which may require evaluating a few hundred trajectories per second, where a trajectory may be a time-dependent sequence of positions. Limitations of existing systems present very serious risks to pedestrians and create significant legal risks for vehicle manufacturers, owners, and services that use the vehicles. The physical risks spill over into adjacent areas such as burdens on emergency services (e.g., law enforcement and hospitals).

Various embodiments of the present disclosure provide an infrastructure-to-vehicle early warning system that reports potential collisions based on road user (e.g., pedestrian, cyclist, etc.) trajectory predictions. A scenario of vehicles with infrastructure-to-vehicle communication is assumed, where the infrastructure at a traffic intersection is capable of tracking road users (e.g., using cameras, radars, lidars, etc.). Information from the tracking may be used to perform road user intent prediction and provide warnings to autonomous vehicles (or other vehicles connected to the infrastructure). Various embodiments may be particularly useful in scenarios in which there is no line-of-sight between the road user that is about to cross near the traffic intersection and the vehicle that is about to turn in the direction of the road user or in which the vehicle can perceive the road user only a short time (e.g., a few milliseconds) before acting. The system may predict the possible conflict and warn the vehicle so that the vehicle can act accordingly. Various embodiments may apply to both signalized and un-signalized traffic intersections, school areas, or other complex scenarios where road users and vehicles coexist. Various embodiments are suitable for implementation using instruction-driven central processing units (CPU) and graphics processing units (GPU), while other embodiments may additionally or alternatively utilize specialized hardware that may integrate sensing and custom computations that can be implemented for high speed.

Figure 1:
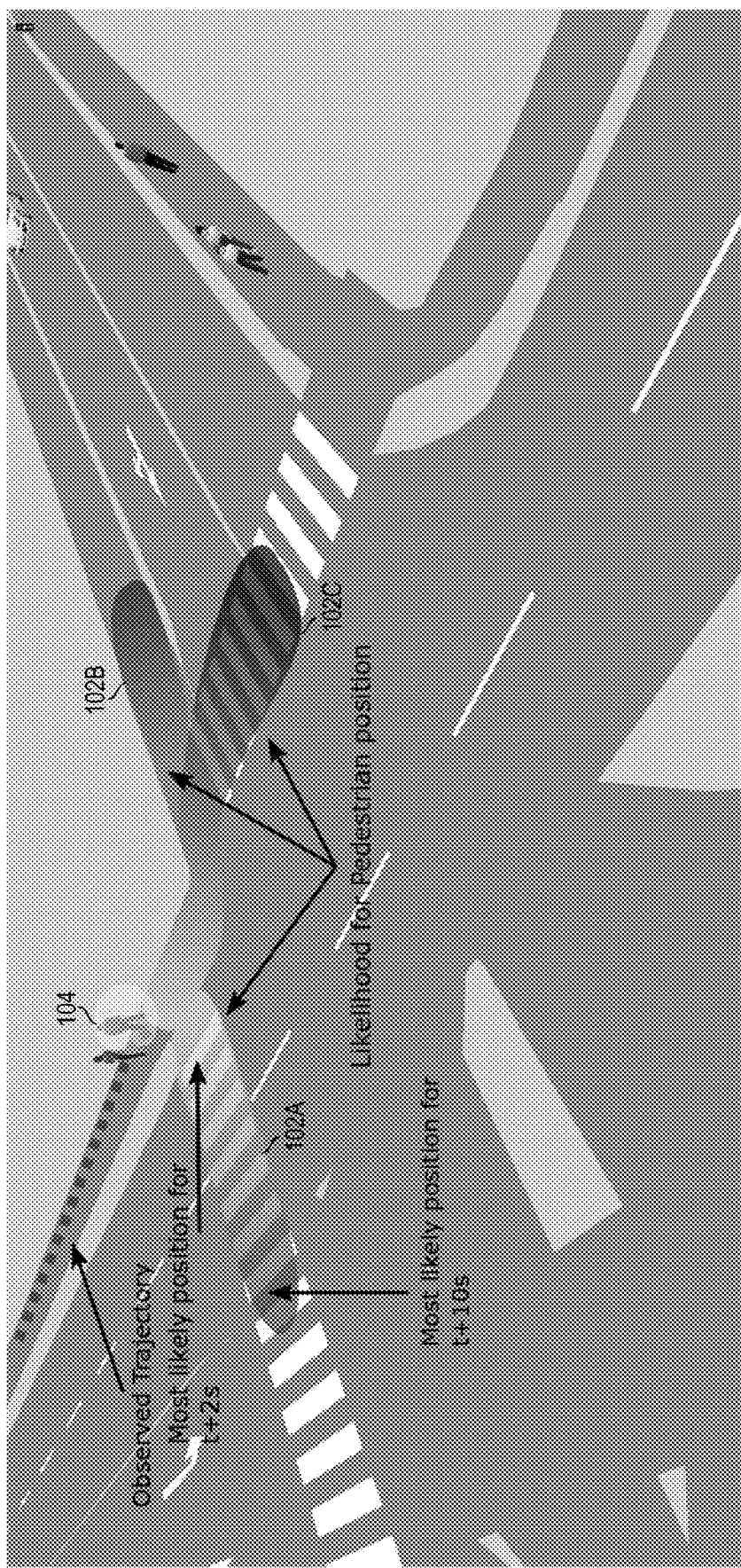
FIG. 1 illustrates various predicted trajectories of a road user in accordance with certain embodiments.
Figure 2:
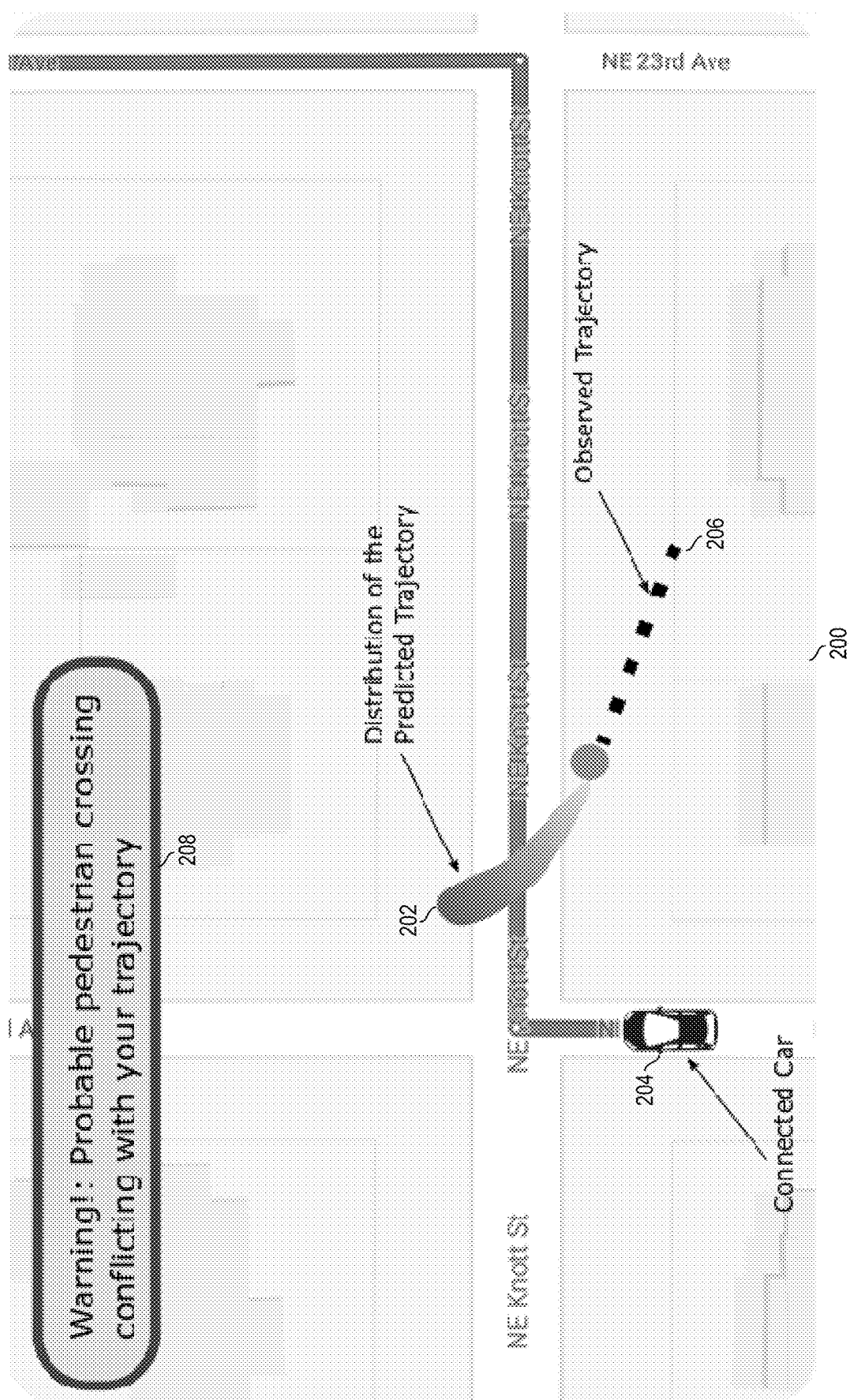
FIG. 2 illustrates an example warning interface in accordance with certain embodiments.

FIG. 1 illustrates various predicted trajectories 102 (e.g., 102A, 102B, and 102C) of a road user 104 in accordance with certain embodiments. One or more of the predicted trajectories or information based thereon may be provided for a vehicle so that a computing system associated with the vehicle or a driver of the vehicle may perform path planning accordingly. In some embodiments, an intelligent infrastructure may provide information about one or more predicted trajectories to the vehicle. In some embodiments, the predicted trajectories may be accompanied with information indicating probabilities of the predicted trajectories. FIG. 2 illustrates an example warning interface 200 in accordance with certain embodiments. In this embodiment, a distribution of the predicted trajectory 202 is communicated to vehicle 204. In the embodiment depicted, an observed trajectory 206 is also communicated to the vehicle 206. In some embodiments, a computing system of the vehicle 204 or a computing system connected to the vehicle 204 may superimpose the distribution of the predicted trajectory 202 and the observed trajectory 206 on a map along with a location of the vehicle 204 and a warning 208.

Embodiments may include a road user real-time intent prediction method based on a combination of Bayesian inference, path planning, optimization, and intelligent infrastructure. In some embodiments, the road user intent prediction method may use path planning as a generative model for hypothesis testing to identify likelihoods over possible trajectories. One particular advantage of using trajectory planning described herein with generative models is that it allows the system to incorporate the context of the road users to understand their observed behavior and predict their trajectories. This may include obtaining, for a particular road user, a likelihood function for each possible goal in the scene (e.g., possible goals can be defined as priors obtained from historical data) as well as to obtain the most likely trajectory that the road user will follow. Various embodiments may implement a fast path planning process to generate plausible trajectories and use the trajectories to jointly infer the goal of the road user and his or her motion profile. In some embodiments, a real-time inference method may utilize a trajectory planning process, which can be exploited as a generative model by Bayesian or Monte Carlo inference methods, and which can be implemented in a probabilistic programming framework. Predictions sent to vehicles will provide infrastructure-to-vehicle (I2V) assistance, which may be especially useful when there is no line of sight between the vehicle and the road user.

Compared with end-to-end neural network prediction systems, various embodiments of the present disclosure may flexibly and easily incorporate obstacles and multiple road users in the scene and provide trajectory predictions that are context-aware. For instance, neural network approaches would generally require re-training to incorporate context information such as construction areas blocking the way of road users, cars interfering in a crosswalk, groups of road users standing near the traffic intersection, etc. Various embodiments described herein are able to incorporate such context information without re-training or modification of the processes.

Various embodiments may include one or more of the following features: a neural network to detect, track and classify road users, a segmentation module to detect the traversable space for road users as well as their designated areas, a detection module to detect the possible goals for the road user trajectories in the scenario in order to use the goals as priors in the inference, an inference module to determine a probability distribution over goals of the user, and a prediction module to predict the most likely trajectory of the user given the probability distribution over goals.

Figure 3:
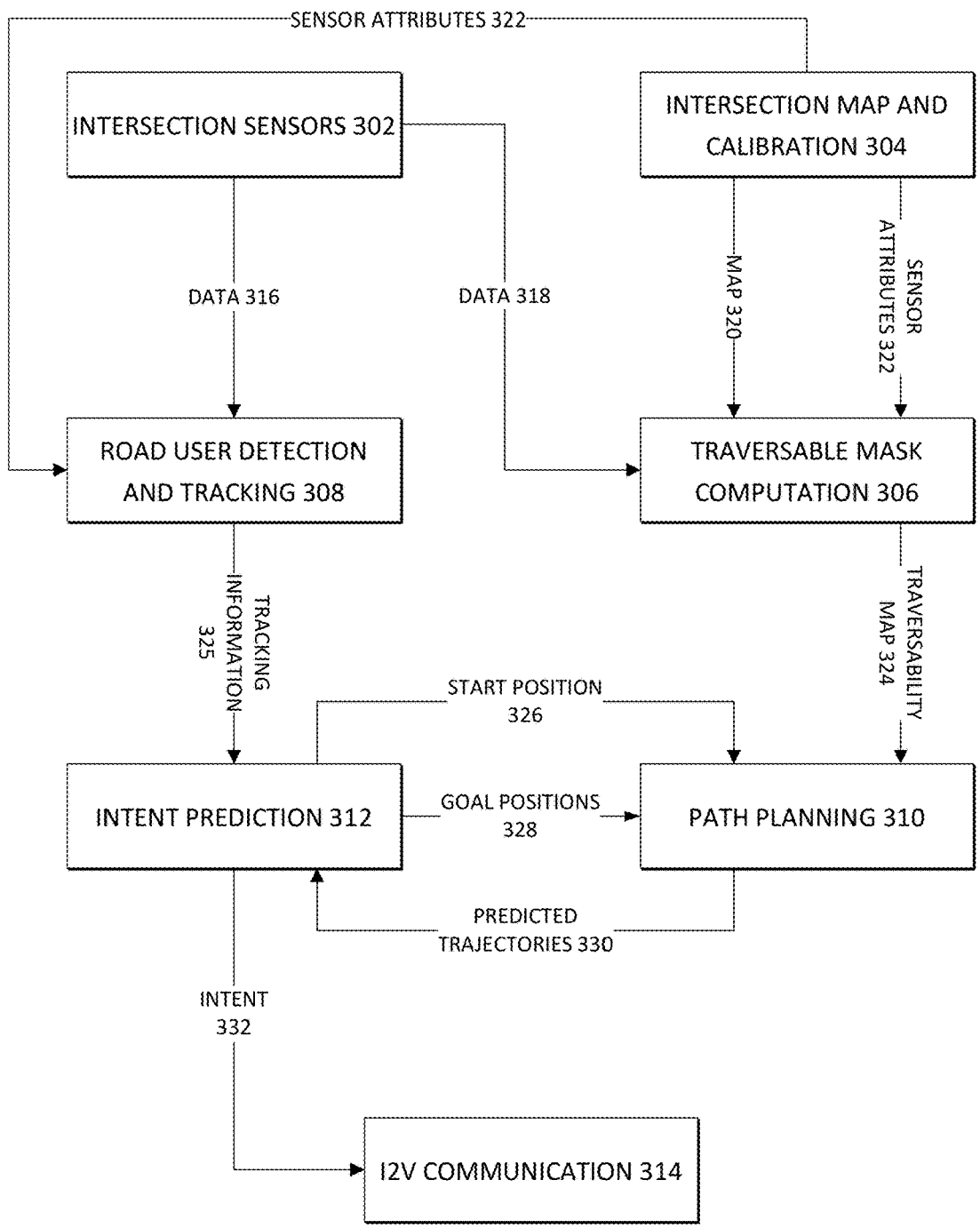
FIG. 3 illustrates a potential collision warning system based on road user intent prediction in accordance with certain embodiments.

FIG. 3 illustrates a potential collision warning system 300 based on road user intent prediction in accordance with certain embodiments. In the embodiment depicted, the system 300 includes intersection sensors 302, intersection map and calibration module 304, traversable mask computation module 306, road user detection and tracking module 308, path planning module 310, intent prediction module 312, and I2V communication module 314.

Road intersection sensors 302 may include any appropriate sensors to extract the information used by the system 300 as a basis for the trajectory predictions. For example, the sensors may include but are not limited to light detection and ranging (LIDAR) sensors, two-dimensional (2D) cameras, three-dimensional (3D) or stereo cameras, ultrasound sensors, radar sensors, and weather sensors (not shown). In various embodiments, the sensors 302 may be located at or proximate an intersection to capture information associated with the intersection.

Sensors 302 may output data 316 and 318 which is provided to road user detection and tracking module 308 and traversable mask computation module 306 respectively. Data 316 or 318 may include timestamped data, such as images, LiDAR point clouds, or other sensed information, or information derived from the sensed information (e.g., the sensors themselves may detect objects and include the locations and boundaries of detected objects in the data 316 or data 318). Data 316 or 318 may provide indications of the locations of road users and other objects (e.g., vehicles) as a function of time. The data may also provide indications of other characteristics of the road users (e.g., the orientation of the road user, the size of the road user or other suitable characteristics).

In some embodiments, data 316 and 318 may be the same data. In other embodiments, data 316 and 318 may differ in content or format. For example, data 318 sent to the traversable mask computation module 306 may have a lower sampling rate than data 316 sent to the road user detection and tracking module 308. As another example, one or both of data 316 and 318 may be filtered or processed before being passed to modules 306 or 308. For example, the data 318 passed to the traversable mask computation could omit position information for road users (alternatively the entire data set may be provided to module 306 and the information needed by module 306 may be extracted from the data set). In other embodiments, the data may be passed to module 308 which may process the data and then provide the processed data to module 306 (e.g., module 308 may determine which of the objects in the data are road objects and which objects are obstacles such that module 306 does not need to perform a similar determination).

Intersection map and calibration module 304 is operable to generate a map 320 of an intersection and perform calibration operations associated with the sensors 302. Map 320 may be a map of an intersection generated based on data obtained through public services such as Google Maps™ or OpenStreetMap, maps from local transportation agencies, or other suitable sources. In an embodiment, map 320 is two dimensional, though other embodiments are not limited thereto. In some embodiments, map 320 may be generated using a 3D mapping system such as a system produced by RIEGL.

Attributes of the sensors 302 (e.g., position, orientation, focal length, pixel size, etc.) may be used in order to project perceived objects into a common space relative to the map 320. Accordingly, during calibration, module 304 may determine values of the sensor attributes 322. These attribute values may be determined in any suitable manner. For example, sensor positioning may be obtained using laser-based positioning cartographic systems or visual-based optimization techniques such as bundle adjustment. The sensor attributes 322 are provided to traversable mask computation module 306 and road user detection and tracking module 308.

In order to properly predict trajectories of road users, the system 300 may determine the non-traversable portions of the intersection and avoid trajectories that would cross through a non-traversable portion. Traversable mask computation module 306 utilizes map 320 and associated metadata to identify regions of the map (e.g., the sidewalk, the street) that are traversable (e.g., regions in which a road user may stand, walk, run, or otherwise traverse) and regions of the map (e.g., houses, buildings, trees) that are not traversable and stores indications of these regions in a traversability map 324. In an embodiment, the traversability map 324 may include a plurality of traversable or untraversable convex regions.

At each timestep processed by the traversable mask computation module 306, sensor data 318 is processed to enrich the traversability map 324 with moving obstacles (e.g., vehicles) and static temporary obstacles (e.g., temporary signals, barriers, construction, parked vehicles, etc.). Because the position of the sensors 302 with respect to the map 320 is known (e.g., included within sensor attributes 322), 3D convex hulls of obstacles detected in data 318 may be mapped to corresponding locations in the traversability map 324 (which may be 2D in some embodiments although is not limited thereto). Accordingly, at each timestep, the traversability map 324 may indicate the locations of static non-traversable obstacles (e.g., buildings, trees, etc.), temporarily static obstacles (e.g., barriers, parked vehicles, etc.), and moving obstacles (e.g., vehicles).

Figure 4:
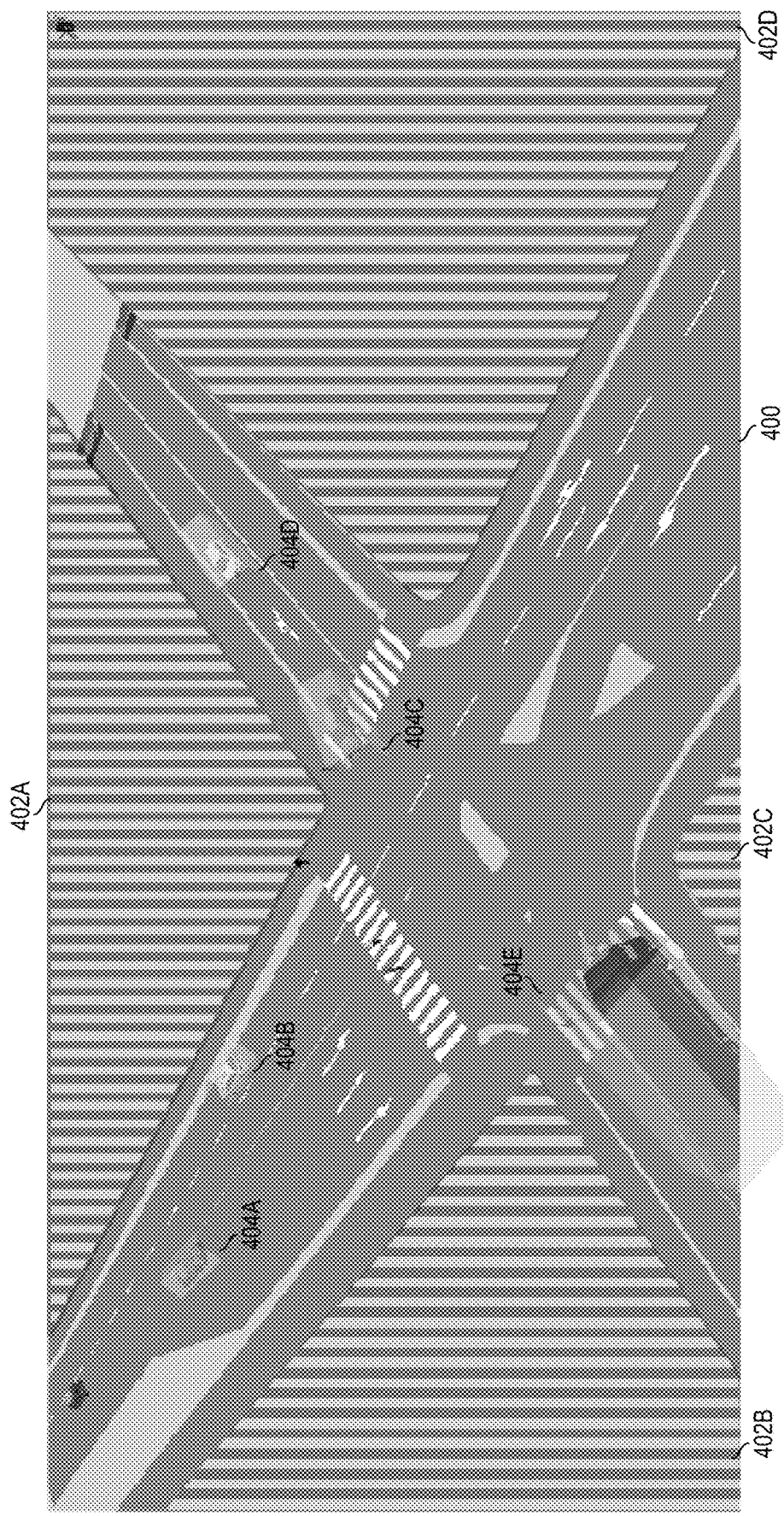
FIG. 4 illustrates a traversability map in accordance with certain embodiments.

FIG. 4 illustrates a traversability map 400 in accordance with certain embodiments. In various embodiments, traversability map 400 may include any suitable characteristics of traversability map 324 and vice versa.

In the embodiment depicted, the striped regions 402A, 402B, 402C, and 402D represent non-traversable regions that are detected in advance of analysis of the sensor data (e.g., representing static non-traversable obstacles). The convex regions 404A, 404B, 404C, 404D, and 404E represent moving obstacles in the street detected via sensor data (e.g., 318). In some embodiments, the size of the convex region associated with a dynamic obstacle (e.g., a moving vehicle) may be based on the size of the dynamic obstacle.

Figure 5:
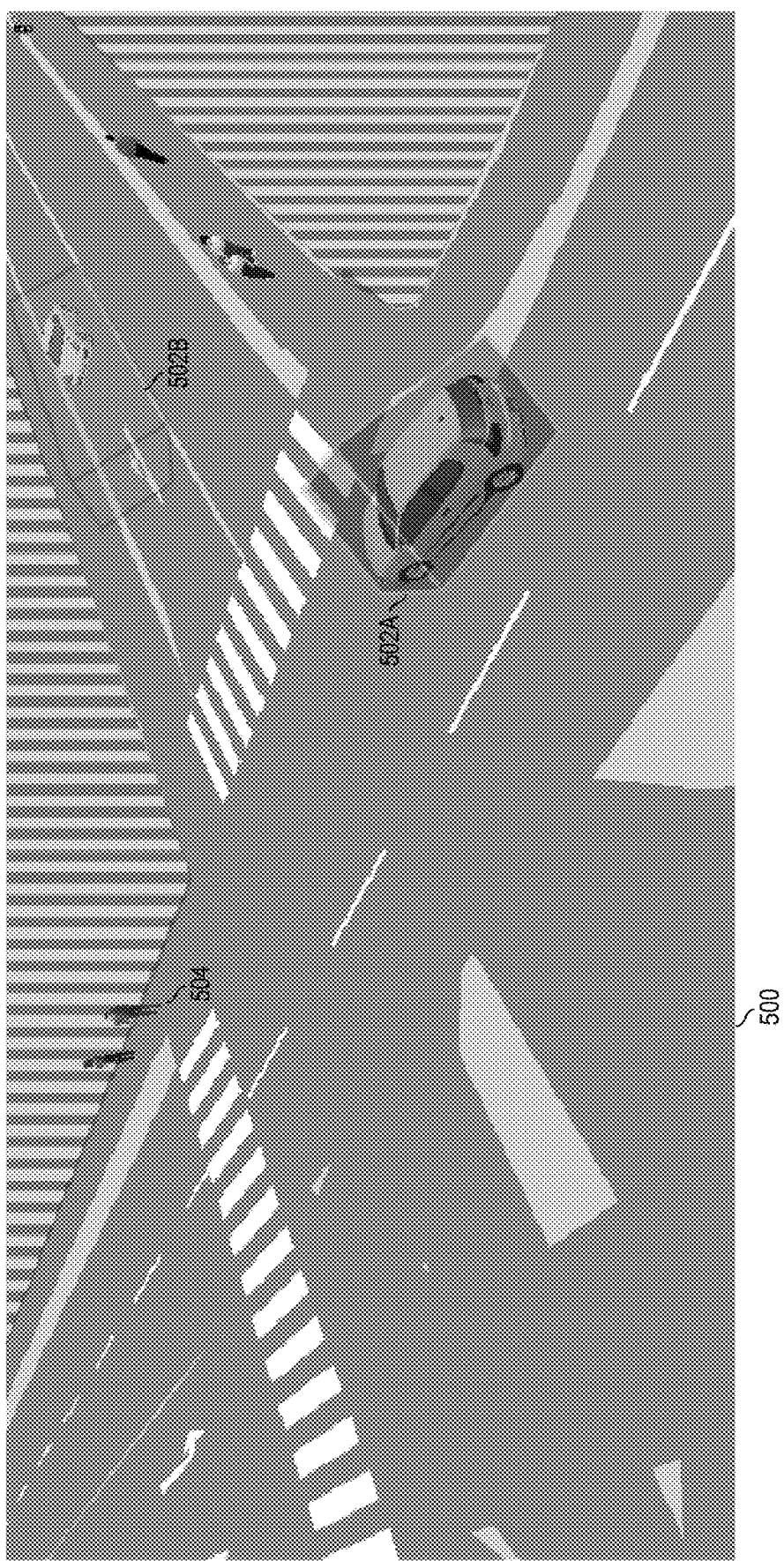
FIG. 5 illustrates velocity dependent regions of a traversability map in accordance with certain embodiments.

In addition, the convex regions that enclose the dynamic obstacles (such as the vehicles) can be expanded to account for velocity. FIG. 5 illustrates velocity dependent convex regions 502A and 502B of a traversability map 500 in accordance with certain embodiments. In the embodiment depicted, the convex region 502A represents a moving object with a low velocity, therefore the convex region is very similar to the size of the associated vehicle. The convex region 502B represents a moving object with a higher velocity. Therefore, the convex region 502B is projected forward due to the higher velocity, thus presenting a larger non-traversable region to nearby road users (e.g., 504).

The road user detection and tracking module 308 is operable to detect road users, track the position of the road users as a function of time, and provide tracking information 325 about the positions to the intent prediction module 312. In detecting road users, the module 308 may classify detected objects as road users (or certain types of road users such as pedestrians, cyclists, etc.) and non-road user objects.

Any suitable processes for road user detection and tracking may be implemented by circuitry of module 308, such as an open source or propriety framework that provides road user detection and tracking of a scene based on the sensor data 316. For example, Spencer people tracking (e.g., as provided at www.spencer.eu), OpenPose (e.g., as described in the paper "OpenPose: Realtime Multi-Person 2D Pose Estimation using Part Affinity Fields" by Cao et al.), or other suitable tracking processes may be utilized by road user detection and tracking module 308. In various embodiments, one or more neural networks may be used to detect, track, and/or classify the road users.

The tracking information 325 produced by module 308 may include, for each detected road user, a series of data points that represent the position of the respective road user as a function of time. In various embodiments, tracking information 325 may include additional information about the road users, such as an orientation of the road user, a size of the road user, or other suitable characteristics that may have a bearing on the trajectory to be taken by the road user.

Figure 6:
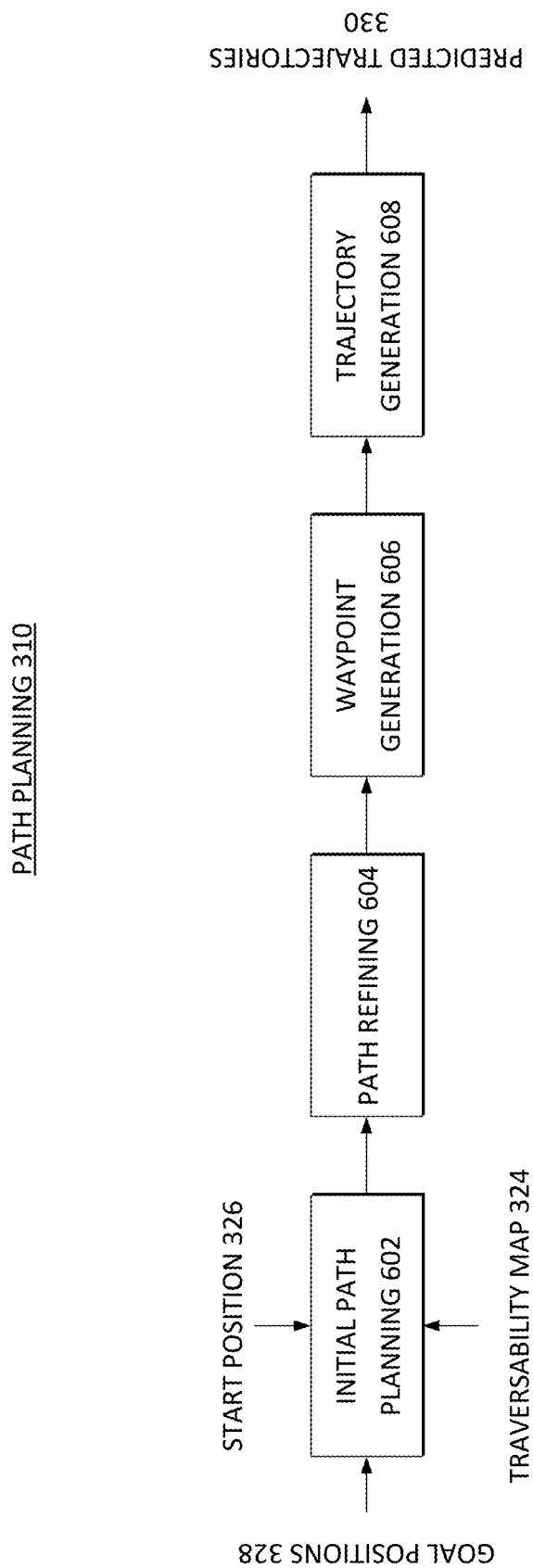
FIG. 6 illustrates a flow for generating predicted trajectories in accordance with certain embodiments.

Path planning module 310 is operable to generate predicted trajectories 330 of road users based on respective start positions 326 and goal positions 328 of the road users. FIG. 6 illustrates a flow 600 for generating predicted trajectories 330 in accordance with certain embodiments. The flow 600 may be performed by the path planning module 310 or other suitable circuitry. Flow 600 includes initial path planning 602, path refining 604, waypoint generation 606, and trajectory generation 608.

During initial path planning 602, obstacle-free paths (where the obstacles may be indicated by non-traversable regions of the traversability map 324) from the start position 326 of a road user (e.g., the current position of the road user) to the goal positions 328 (e.g., the most likely destinations of the road user as inferred by intent prediction module 312 based on attributes of the road user and historical data of other road users) are generated.

Figure 7:
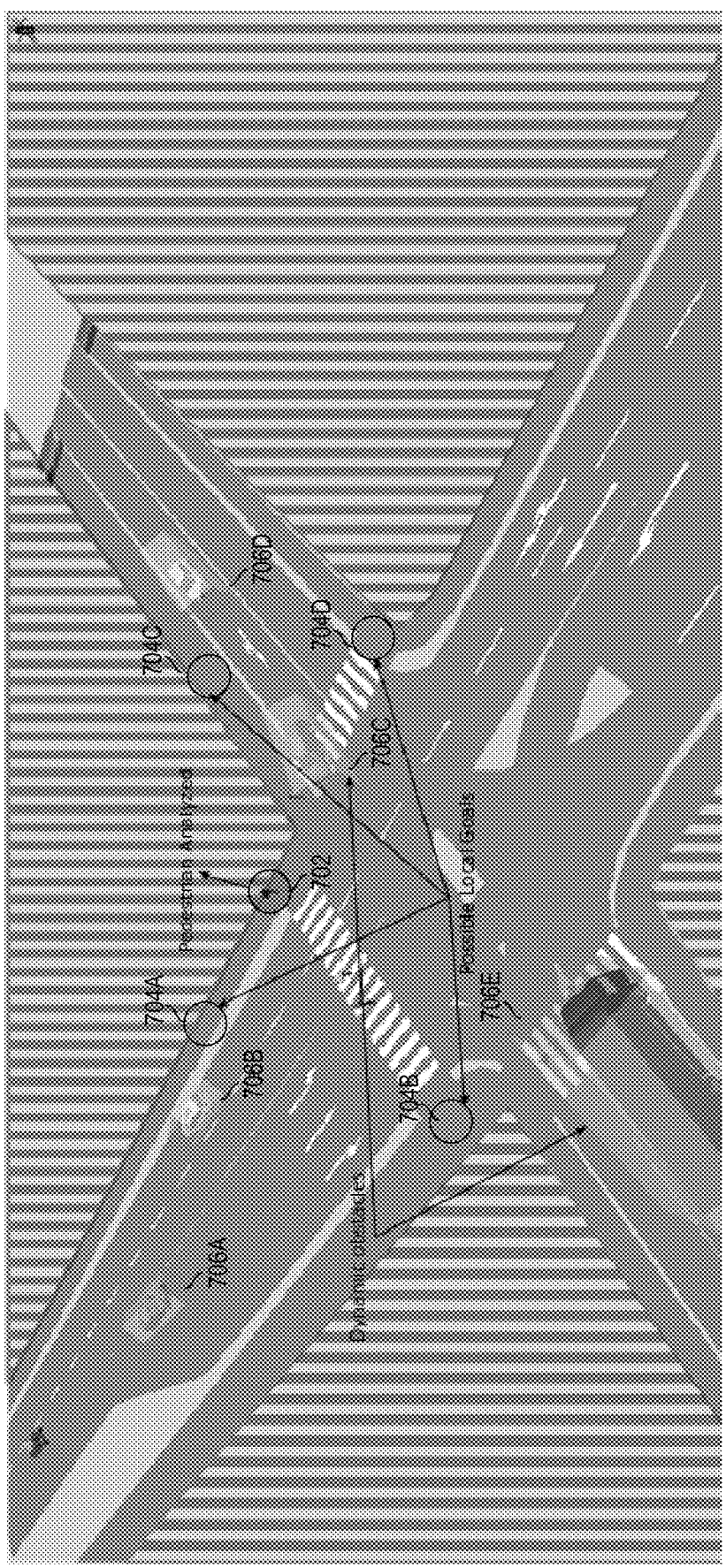
FIG. 7 illustrates a start position and goal positions of a road user in accordance with certain embodiments.

FIG. 7 illustrates a start position 702 and goal positions 704 (e.g., 704A, 704B, 704C, and 704D) of a road user in accordance with certain embodiments. As in the previous example, the striped portions of the depiction represent non-traversable regions and may be omitted from the search space for the trajectories. Furthermore, the dynamic non-traversable regions 706 (e.g., 708A, 706B, 706C, 706D, and 706E) may be omitted from the search space as well.

Figure 9B:
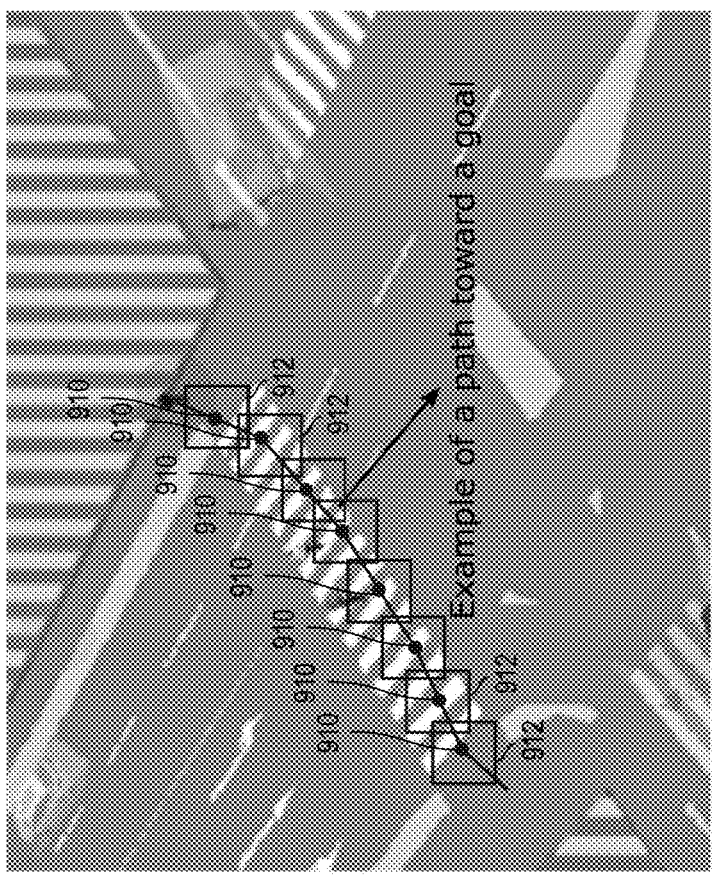
FIGS. 9A and 9B illustrate a path and associated waypoints in accordance with certain embodiments.
Figure 9A:
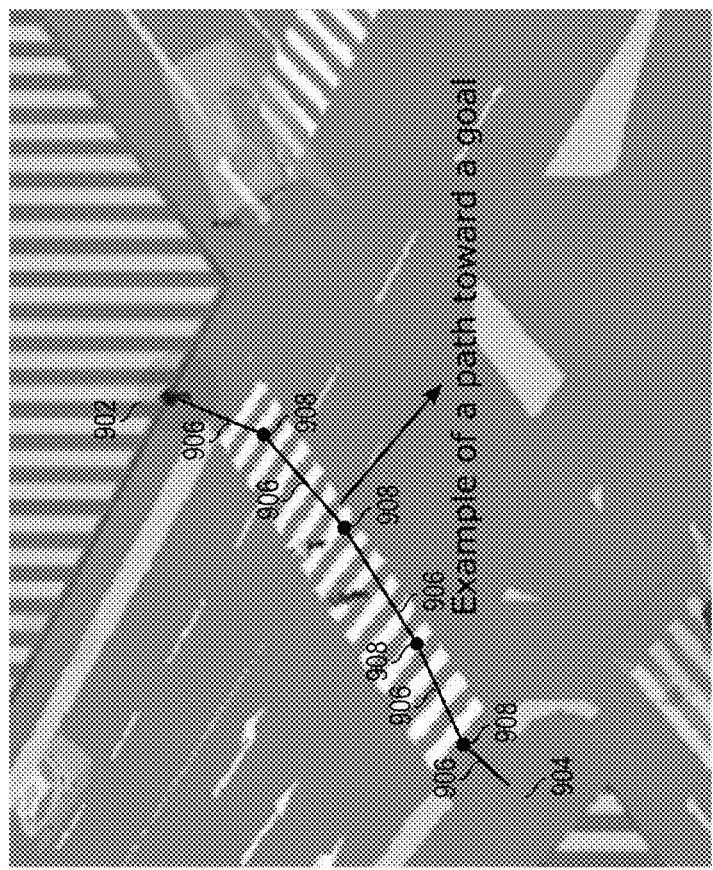

In various embodiments, sampling-based or stochastic search methods may be utilized to generate the obstacle-free paths at 602. Such methods may be effective and may quickly find traversable paths while avoiding discretization of the search space. An example path from a start position 902 to a goal position 904 is depicted in FIG. 9A. The path may include a plurality of path segments 906 between nodes 908 of the path determined during initial path planning 602.

During path refinement 604, the paths are processed to identify paths from the initially generated paths that are more likely to be taken by the road user associated with the start position and goal positions (e.g., the identified refined paths may be shorter, smoother, and/or otherwise better than initial paths randomly generated at 602).

In an embodiment, a Rapidly-exploring Random Tree (RRT) process is used to generate paths from the start position to the goal positions. An RRT may grow a tree from the start position by using random samples from the search space. When a sample is drawn, a connection is attempted between that sample and the nearest state in the tree. If the connection obeys all constraints (e.g., does not pass through an obstruction), a new state is added to the tree. In various embodiments, the computational time of RRT is on the order of micro-seconds. Therefore, in some embodiments, one or several paths can be easily generated for each one of the possible goal positions (e.g., the RRT process may be run multiple times if multiple paths are desired between a start position and a goal position). The initial path could be refined in any suitable manner, such as curve fitting, linear regression, or other suitable methods.

In various embodiments, a Rapidly-exploring Random Trees Star (RRT*) process is used to generate the paths from the start position to the goal positions. In some embodiments, the RRT* process may be asymptotically optimal when coupled with continual path refinement. The initial path generation in RRT* may operate in a similar manner to RRT, but RRT* also allows for heuristics to be added to the path planning process via a cost function that may be used to refine an initially selected path at 604. For example, after the initial path generation, RRT* may continue to update a generated path in order to find a path that has a lower cost than a cost of the initially generated path. RRT* may generate a new sample that is not part of the path, evaluate the effect of the new sample, and replace a node of the current path with the new sample if the replacement results in a lower cost path. In an embodiment, the cost function used during path refinement may comprise a weighted sum of optimization objectives learned from historical data. In some embodiments, the cost function may be obtained by methods such as inverse optimal control or inverse reinforcement learning. In various embodiments, the aim is to find a path that minimizes the cost function. A new random node may be sampled and its neighbor nodes within a particular radius are rewired if this would result in a path with a lower cost function.

In a basic version of RRT*, the cost function simply evaluates the distance (e.g., Euclidean distance) of the path (with shorter distances having lower costs). In other embodiments, the cost function may be based on any one or more features, such as the Euclidean distance of the path, a measure of safety of the path (e.g., an average distance of each node to the nearest obstacle or a preference for a path that traverses a designated crosswalk), an achievable velocity for a road user taking the path, or other suitable path characteristic. Alternatively, increased safety of the path could be achieved by artificially increasing the size of the obstacles and requiring the path to be obstacle free.

In various embodiments, the cost function used (e.g., the weight coefficients of the cost function) may be based on an inference of a preferred path type of the road user (e.g., whether the road user is likely to prefer the shortest path or the safest path, whether the road user is likely to make sharp direction changes, etc.) and could be different for different types of road users. The inference as to which type of path may be preferred by the user may be performed in any suitable manner. For example, the inference may be made, e.g., by the intent prediction module 312, based on characteristics of the road user as captured in data 316 and communicated to the path planning module 310. The inference could also be based on historical data associated with road users. For example, the inferences made may vary based on a location of the intersection (e.g., road users in a particular country or city may express different preferences than road users in a different country or city).

In some embodiments, during refinement of the paths, the sampling space for the paths can be constrained. For example, an ellipse or other suitable shape may be used to refine the paths by pruning out paths that are not included within the constraining shape. In general, when the cost function minimizes the Euclidean distance, ellipses may be used and if the goal is to optimize some other parameter or set of parameters, another shape may be used. For example, any shape that allows checking of whether a point is inside the shape or not may be used, e.g., boxes, cylinders, spheres, etc.

Figure 8:
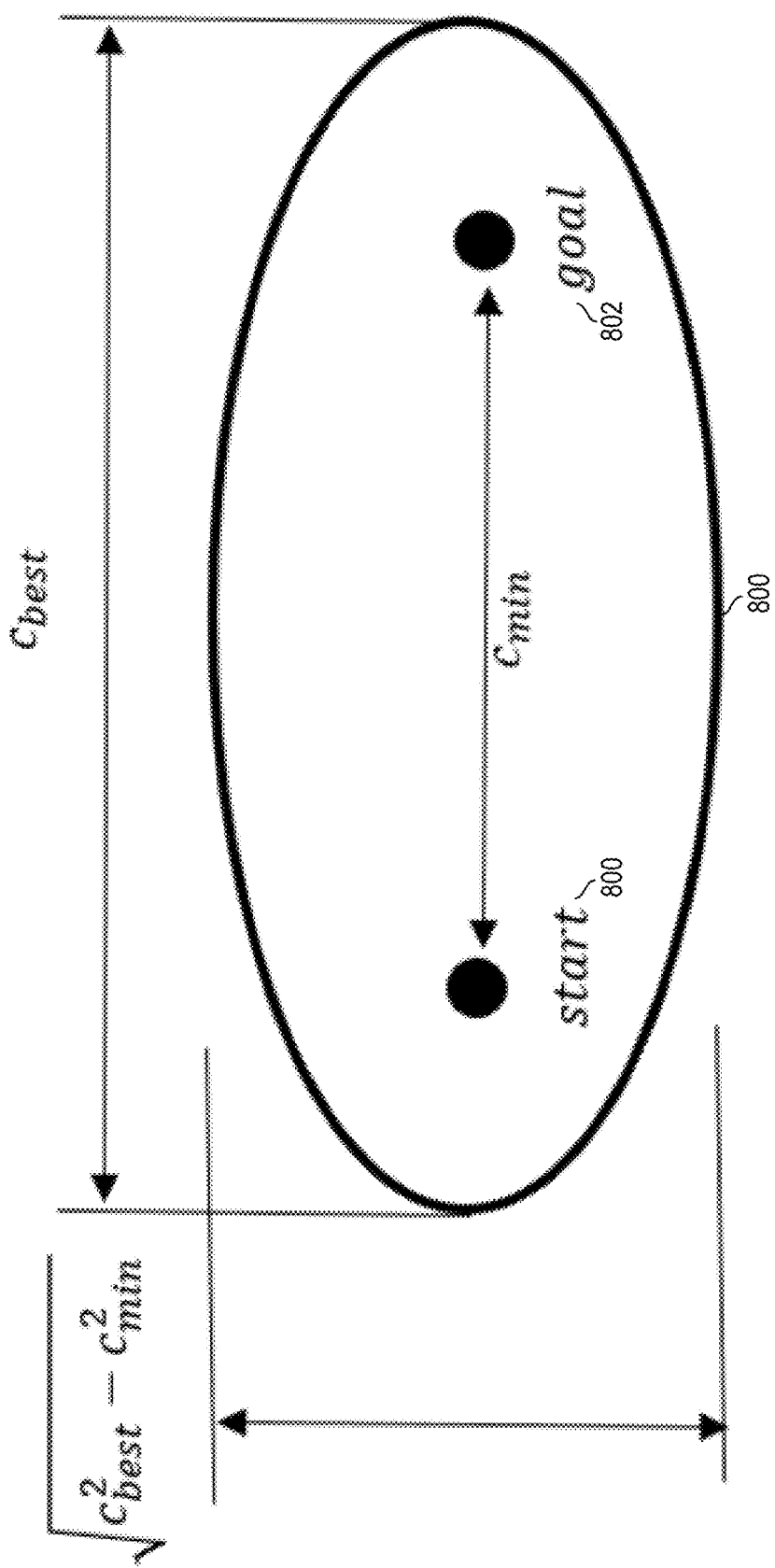
FIG. 8 illustrates a constrained shape for path selection in accordance with certain embodiments.

FIG. 8 illustrates a constraining shape 800 for path selection in accordance with certain embodiments. In the embodiment depicted, the constraining shape is an ellipse. In some embodiments, the optimal solution generation during path refining at 604 can be accelerated by sampling over defined regions modeled as ellipses, rather than sampling over the complete map of traversable regions. Each ellipse can be defined with start 800 (corresponding to a start position) and goal 802 (corresponding to a goal position) as focal points. The straight line distance length between start 800 and goal 802 is illustrated as the theoretical minimum cost, $c_{min}$. The shape of the ellipse may also be defined by the cost (e.g., length) of the best path solution found to date, $c_{best}$. The eccentricity of the ellipse is given by $c_{min}/c_{best}$.

The defined size of the ellipse ensures that the previous best path will be inside of this new ellipsoid. If a path which is better than the path with cost $c_{best}$ is found (e.g., by replacing a node of the current best path with a randomly sampled point within the ellipse), then $c_{best}$ is updated based on this new path and a new ellipse is created based on the new $c_{best}$. This pattern continues and the ellipses shrink in size over the iterations until the best path is identified. If there are no obstacles between the start 800 and the goal 802, the final ellipse may be small enough that it only includes the straight line path from start 800 to goal 802.

In other embodiments, any other suitable processes may be executed to generate initial paths or refine paths. For example, Batch Informed Trees (BIT*), Regionally Accelerated BIT* (RABIT*), or Informed Optimal Rapidly-exploring Random Trees (IRRT*) may be used, among others.

After the paths are generated at 602 and refined at 604, waypoints are generated at 606. FIG. 9B illustrates a path and associated waypoints 910 in accordance with certain embodiments. As explained earlier, an example path from a start position 902 to a goal position 904 is depicted in FIG. 9A, where the path includes a plurality of path segments 906 between successive nodes 908 of the path. The path depicted in FIG. 9A is time independent, as it it simply shows a traversal from the start position 902 to goal position 904. The waypoints 910 may be assigned in order to generate a trajectory which is dependent on the assumed velocity of the road user.

In an embodiment, a series of time-indexed waypoints 910 (which may be notated as ω[k], where k is the index number of the waypoint) are assigned to positions on the path. Each waypoint 910 may have an associated boxed region 912 (which may be notated as Ω[k]) that has an edge length of 2l, where l is a design parameter based on the minimum distance from the path to an obstacle region. In an embodiment, a constant velocity is assumed for the road user from one waypoint to the next.

The regions 912 may be used to introduce soft constraints for a formulation of an optimization problem that may be used to generate one or more trajectories at 608. The optimization problem may define the velocities and accelerations that the predicted trajectory will have. In general, the solution of the optimization problem should satisfy p[k]=p(hk) ∈ Ω[k], where k is the time index number and h is a length of a timestep (p(t) may represent a continuous-time trajectory while p[k] is a discrete-time trajectory such that p(hk)=p[k]). In other words, for each k, the position of the road user should be located within the corresponding boxed region 912. The time step h and maximum velocity $V_{max}$ may be chosen as a function of l and a boundary in the maximum acceleration $A_{max}$ of the road user. For example, $V_{max}$ may be the square root of $l*A_{max}$ and the time step h may solved as follows:

$$h^2 = \frac{4l}{A_{max}}$$

Varying the $A_{max}$ of the road user may result in generation of multiple sets of trajectories for the same path (as the trajectory changes with a change in speed). In some embodiments, $A_{max}$ may be inferred by the system 300 (e.g., by intent prediction module 312) based on a time elapsed since the start of the walk signal, anticipated time to a walk signal, change in the state of a walk signal, or other suitable information. Road users may have different accelerations and velocities, thus the constraints may be adjusted based on their velocities.

The optimization problem could be posed in the form of a Quadratic Program, but the solution of each optimization problem may reach a computational time of hundreds of milliseconds for each trajectory. In various embodiments, only the time approximation is used at each waypoint. Thus, instead of having to solve the optimization problem, an assumption is made that the position of the road user will be within the shown square regions 912, taken as functions of time. Thus, each waypoint is associated with an indexed time that allows comparison with the observed trajectory of the road user to produce the likelihood of each path as explained in greater detail below. Some embodiments may avoid the need to solve multiple optimization problems in an iterative or sequential fashion.

At 608, trajectories are generated. The trajectories are each a sequence of points that are each separated by a respective timestep. As described above, during the waypoint generation, waypoints 910 and associated regions 912 around the waypoints are assigned. During the trajectory generation 608, a point inside each box (which could, but is not required to have the same location as the waypoint) may be selected as part of the trajectory. In order to generate the trajectory, a set of paths may be created from the start position to all the surroundings goal positions. Then, those paths may be re-discretized with different lengths, thus generating a wider set of paths. For example, paths may be mapped to time, e.g., using the aforementioned equation:

$$h^2 = \frac{4l}{A_{max}}$$

In order to produce a wider range of trajectories, the constant 4 in the equation above may be varied. For example, 4l in the above may be replaced with, e.g., 0.5l, l, 2l, 3l, etc. in one or more iterations of trajectory generation. In various other embodiments, trajectories may be generated in any suitable manner (e.g., with or without the use of waypoints). The different trajectories generated will subsequently have likelihoods assigned to them by the intent prediction module 312.

In various embodiments, for scenarios that remain relatively constant, a neural network may be trained to generate the trajectories, which would further accelerate the trajectory planning. A neural network approach may provide for high accuracy, efficiency, and speed of generating trajectories within a generative model. In other embodiments, the trajectories may be generated according to an optimization problem. In yet other embodiments, no additional processing is performed at 608, and the waypoints are used as the points of the trajectories.

The path planning module 310 may generate any suitable number of trajectories based on any suitable real time inferences or historical information. For example, in order to model the different behaviors that road users might show, the predictive models may utilize a risk parameter for each road user (e.g., a road user with a low risk parameter will only cross when the road user gets the right of way, whereas a road user with a higher risk parameter may cross the street even if a car is approaching). As another example, other contexts may be used to generate the trajectories, such as the state of the traffic lights, other road users standing or walking, changes in the environment (e.g., vehicles blocking the crosswalks, speeds and changes in speeds of road users as they approach traffic intersections, trajectories of approaching vehicles, etc.), and other contextual elements such as time of day and its influence over the road user traffic (e.g., as captured in historical training). As yet another example, various embodiments may take into consideration the diversity of motion profiles that road users might exhibit when calculating trajectories, such as different walking speeds, different orientations, different risk taking (e.g., crossing in a non-designated area), sharp direction changes, or other motion characteristics. The trajectories may also be influenced by a time analysis of observed road user trajectories to detect contextual acceleration (e.g., road users may accelerate their speed of crossing later during a walk signal compared with earlier in a walk signal).

Any other suitable processes may be used in various embodiments to generate trajectories, such as optimization of an objective function with smoothness and collision costs solved by functional gradient descent (e.g., CHOMP) or gradient-free candidate sampling (e.g., STOMP).

The predicted trajectories 330 are passed to the intent prediction module 312. Road user intent prediction module 312 may use the path planning as a generative model for hypothesis testing to identify likelihoods over possible trajectories. Thus, the intent prediction module 312 may utilize an observed trajectory of a road user to assign likelihoods to a plurality of goal positions and trajectories to those goal positions. In various embodiments, module 312 may utilize Bayesian inference to evaluate the likelihoods, where Bayesian inference is a method of statistical inference in which the probability of a prediction is updated as additional evidence becomes available. Thus, at each timestep of the module 312, the module 312 may update the predictions for the trajectories received.

Each of the generated predicted trajectories may be represented as $\tau_p$, while an observed trajectory may be represented as $\tau_u$. As detailed below, for the generated trajectories $\tau_p$, a likelihood function may be used to compute the posterior probability density function (PDF) over the goal positions given the partially observed trajectory: $p(\tau_p{}^i|\tau_u)$. The value of this PDF may be used to warn vehicles of likely prospective conflicts.

The observed trajectory $\tau_u$ may include the tracked position of the road user u at each time index k, such that that $\tau_u[kh]$ is the position of the user at time kh, where h is the discretization time step (which may represent the sampling rate of the observations). The set of l trajectories generated for each goal is denoted as $\tau_p{}^i$ such that i={0, 1, . . . , l}, where each trajectory may be generated based on different characteristics of the road user (e.g., different assumed velocities or accelerations). The PDF given the observed trajectory is defined as:

$$(\tau_p{}^i|\tau_u)\Sigma_{k=0}^{K}\text{Normal}(\tau_p{}^i[kh]|\tau_u[kh],\epsilon)$$

In the above, K is the time index of the last observation and Normal($\tau_p{}^i[kh]|\tau_u[kh]$, $\epsilon$) is the value of the normal distribution with a mean of $t_u[kh]$ and variance $\epsilon$ evaluated at $\tau_p{}^i[kh]$. $\epsilon$ is a hyper-parameter defining the width of the Gaussian that in various embodiments can be learned from the variance of trajectories in an observed trajectory dataset, manually tuned depending on the accuracy and noise level of the tracker, or inferred as part of the inference process by solving: $\epsilon^* = \text{argmax}_\epsilon[p(\tau_p^i|\tau_u)]$ several values may be used for $\epsilon$ and the epsilon that results in the highest likelihood may be used). In general, if the sensors are noisy, $\epsilon$ will increase but if noise is low, $\epsilon$ will decrease.

In essence, the calculation represents the likelihood that the locations of proposed trajectory correspond to the locations of the observed trajectory. Locations that are not close together will result in values that decay exponentially due to the nature of the gaussian. The sum of the evaluations of the normal function at each time index results in a value that may be interpreted as a likelihood. The equation may be evaluated for each trajectory i between a start position and a goal position. Similar evaluations may be made at the timestep of the intent prediction module 312 for other trajectory sets between the start position and other goal positions (and for other trajectory sets associated with other road users).

The window over which the summation is evaluated may be any suitable window. For example, the summation may be made over all k values for which observation data is available. As another example, the summation may be made over a certain number of the most recent (e.g., 10) observations.

In other embodiments, any other suitable schemes for determining measures of similarities between observed points and predicted points may be utilized. For example, the Hausdorff distance or Frechet distance could be used to compute the similarity of observed and predicted trajectories and used as a basis to compute likelihoods of predicted trajectories.

After the evaluations of $p(\tau_p^i|\tau_u)$, a process may be executed based on the results to determine one or more trajectories that the road user is most likely to execute. In various embodiments, any one or more of the following processes may be used to select the one or more trajectories:

MAP (Maximum A Posteriori): The likelihood function may be multiplied with a prior distribution over goals (based on historical data) and the maximum of the result is used as the inference result. For example, for a particular intersection 80% of the road users may cross to a first goal position and 20% may cross to a second goal position. The likelihood results for trajectories to the first goal position may then be multiplied by 0.8 and the likelihood results for trajectories to the second goal position may be multiplied by 0.2, and the trajectory corresponding to the maximum of the results is selected.

ML (Maximum Likelihood): The value of $\tau_p^i$ is chosen such that it maximizes $p(\tau_p^i|\tau_u)$. In other words, the trajectory with the maximum likelihood result is selected.

Expected value: A weighted average of $p(\tau_p^i|\tau_u)$. $E[p(\tau_p^i|\tau_u)] = \Sigma_{i=0}^I [\tau_p^i p(\tau_p^i|\tau_u)]$. This process essentially combines the trajectories together based on their likelihood results in order to generate the selected trajectory. While this process may not produce good results when the goal positions are far apart (e.g., one towards the south end of the intersection and one towards the east end of the intersection), it may produce reliable results when the goal positions are closer together.

Threshold: All the likelihood results from evaluation $(\tau_p^i|\tau_u)$ that are over a likelihood threshold are selected. In this instance, multiple trajectories may be selected (whereas in the other processes, a single trajectory is selected).

The selection of the inference process to use might depend on several criteria that may be static or dynamic such as, the reliability of the sensor data, accuracy/computation tradeoffs, and so on. As just one example, when the sensor data is unreliable, the priors may be relied on more heavily and thus the MAP process may be used.

Figure 10:
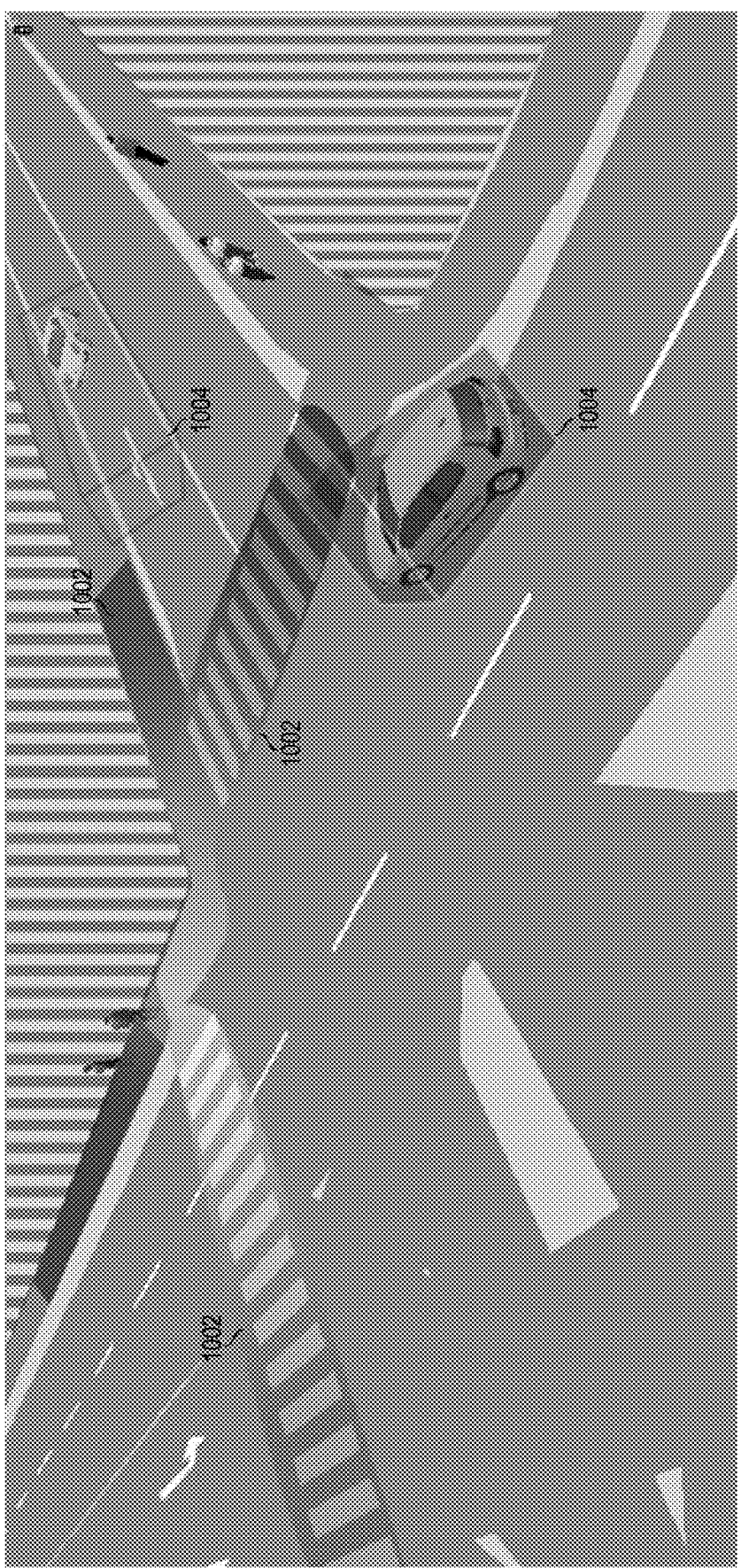
FIG. 10 illustrates probability distributions associated with various trajectories in accordance with certain embodiments.

FIG. 10 illustrates probability distributions 1002 associated with various trajectories in accordance with certain embodiments. FIG. 10 also illustrates how dynamic obstacles 1004 may be artificially inflated to account for their velocity and how such information may be taken into account in the planning (e.g., trajectories for road users may be generated that project the road user crossing before the vehicle if an estimation that a safe distance is maintained is made).

Along with generating possible trajectories and the likelihood of those trajectories, in various embodiments the trajectory likelihoods may be used to assign probabilities for the different possible goals. As an example, an intersection may have four possible choices for a goal X (e.g., forward, left, right, or back). Using historical data, the frequency with which each choice is taken may be determined and normalized to use as a prior. For example, $p(X)=(0.7, 0.15, 0.14, 0.01)$. When data is observed, for each goal, the distance between the expected trajectory towards that goal (generated by the planner) and the observed trajectory indicates how likely it is that the road user is moving towards that goal given the observation (O). Therefore, using Bayes theorem, the prior times the likelihood divided by the evidence Z is equal to the posterior probability: $p(X|O)=p(X)p(O|X)/Z$. In this discrete case, Z can be computed such that it normalizes $p(X|O)$.

Figure 11:
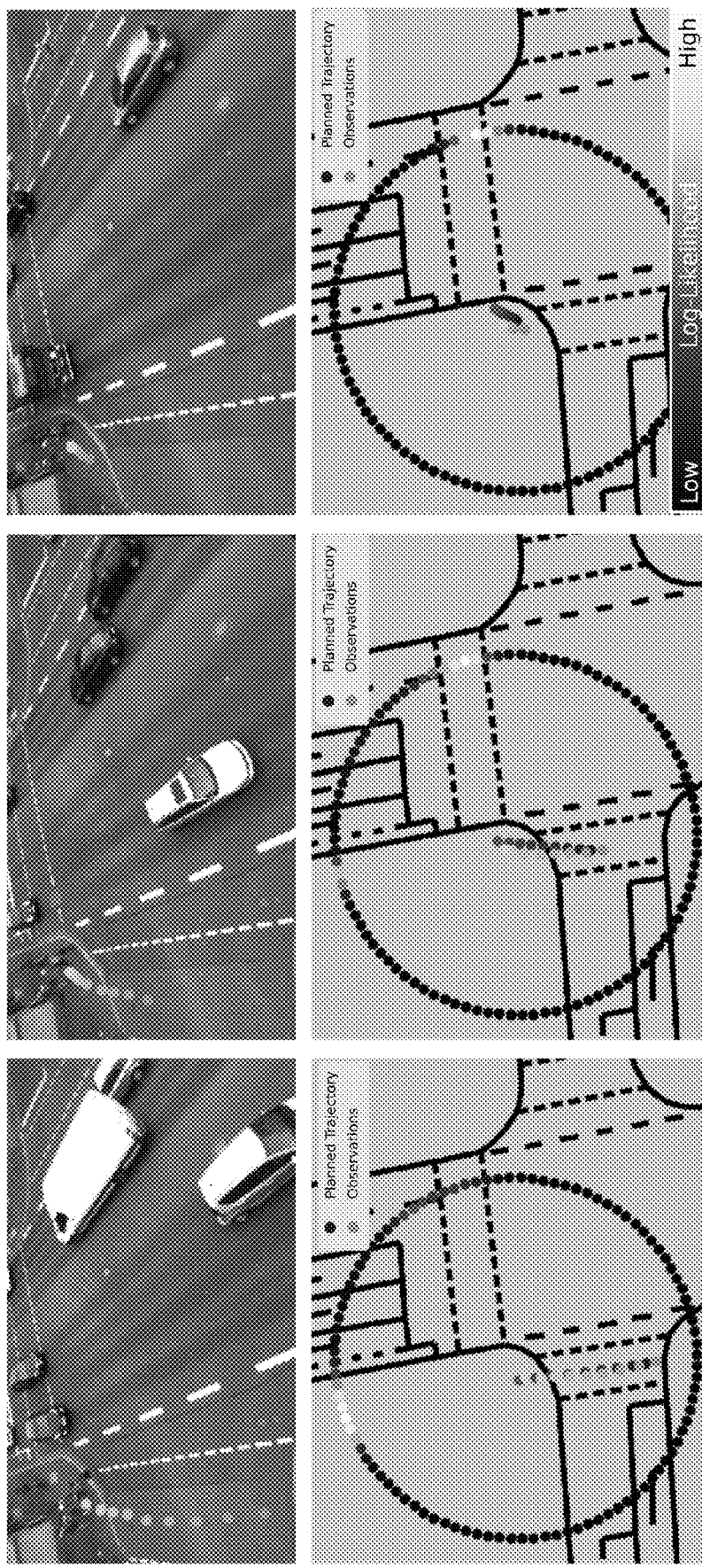
FIG. 11 illustrates likelihoods of various goal positions in accordance with certain embodiments.

FIG. 11 illustrates likelihoods of various goal positions in accordance with certain embodiments. FIG. 11 illustrates a scenario, in which for simplicity, only road users inside the area of interest within the circle are tracked. Thus, the points in the circumference of the circle where the road user exits the area of interest may be considered goal positions.

The top of each column shows a frame from a real-world scene and the bottom of each column depicts an inferred goal posterior. The observed and planned trajectories are also shown. The observation is the road user's trajectory for 10 consecutive points obtained at a sampling rate of, e.g., 1 Hz.

FIG. 11 illustrates three frames of the trajectory of a pedestrian approaching an intersection, each 4 seconds apart. In the first frame, the road user is crossing the street and approaching a second crossing area, and there is a high likelihood for the road user to continue straight and a lower (but also high) likelihood on for the road user to turn right. In the next frame, the trajectory turns slightly right while reducing speed, and the likelihood to turn right increases and the likelihood to continue straight is reduced. In the last frame, as the observed trajectory turns slightly right and stops near the crossing area, the mass of the distribution predicts that the road user is to cross the street toward the right.

If the one or more selected trajectories for a road user are in conflict with a trajectory of a vehicle, these trajectories may be communicated to the I2V communication module 314 to warn the vehicle based on the predicted trajectory information, such that the trajectory of the vehicle may be altered to reduce the risk of collision. For example, the velocity and/or direction of the vehicle may be changed responsive to the warning.

The trajectory information may be communicated to the I2V communication module 314, the conflicting vehicle, a computing system that performs path planning for the conflicting vehicle, or other suitable computing entity that facilitates operation of the vehicle. The trajectory information may take any suitable format. For example, the trajectory information may include a trajectory, a likelihood of a trajectory, a location of the potential conflict, an amount of time until the potential conflict, a message that a potential conflict exists, instructions that may be followed to avoid the conflict, or other suitable information associated with the trajectory of a road user.

In various embodiments, the V2I communication module 314 may include or be coupled to circuitry to determine whether any nearby vehicles have trajectories that are in conflict with any of the trajectories determined for the road users and may send a warning including trajectory information to the vehicle responsive to a determination of a conflict. Accordingly, the V2I communication module 314 may access information describing the trajectories of nearby vehicles. In other embodiments, the V2I communication module 314 may send (e.g., periodically) trajectory information of road users to nearby vehicles or a computing system in communication with nearby vehicles and the vehicles (or a connected computing system) may determine whether a conflict exists.

FIGS. 12-17 illustrate example environments in which various aspects of the present disclosure may operate or various components that may be used to perform operations described herein. For example, any of the modules (e.g., 302, 304, 306, 308, 310, 312, 314 implemented by a processor, such as roadside computing devices (e.g., 1240), fog- or cloud-based computing systems (e.g., 1250), processor 1600, computing system 1700, or other suitable combination of circuitry (which in some cases may include a computer readable medium with instructions for execution of various operations described herein). As another example, any of the sensors described below may be used to collect the sensor data associated with the intersection. As yet another example, any information provided for a vehicle (e.g., trajectory information) may be sent by I2V module to any suitable computing system (e.g., 1240, 1250) connected to or integrated with the vehicles described below. In various embodiments, any one or more operations described herein may be performed in-vehicle or by one or more servers coupled to a vehicle (various processing environments are described in more detail below).

Figure 12:
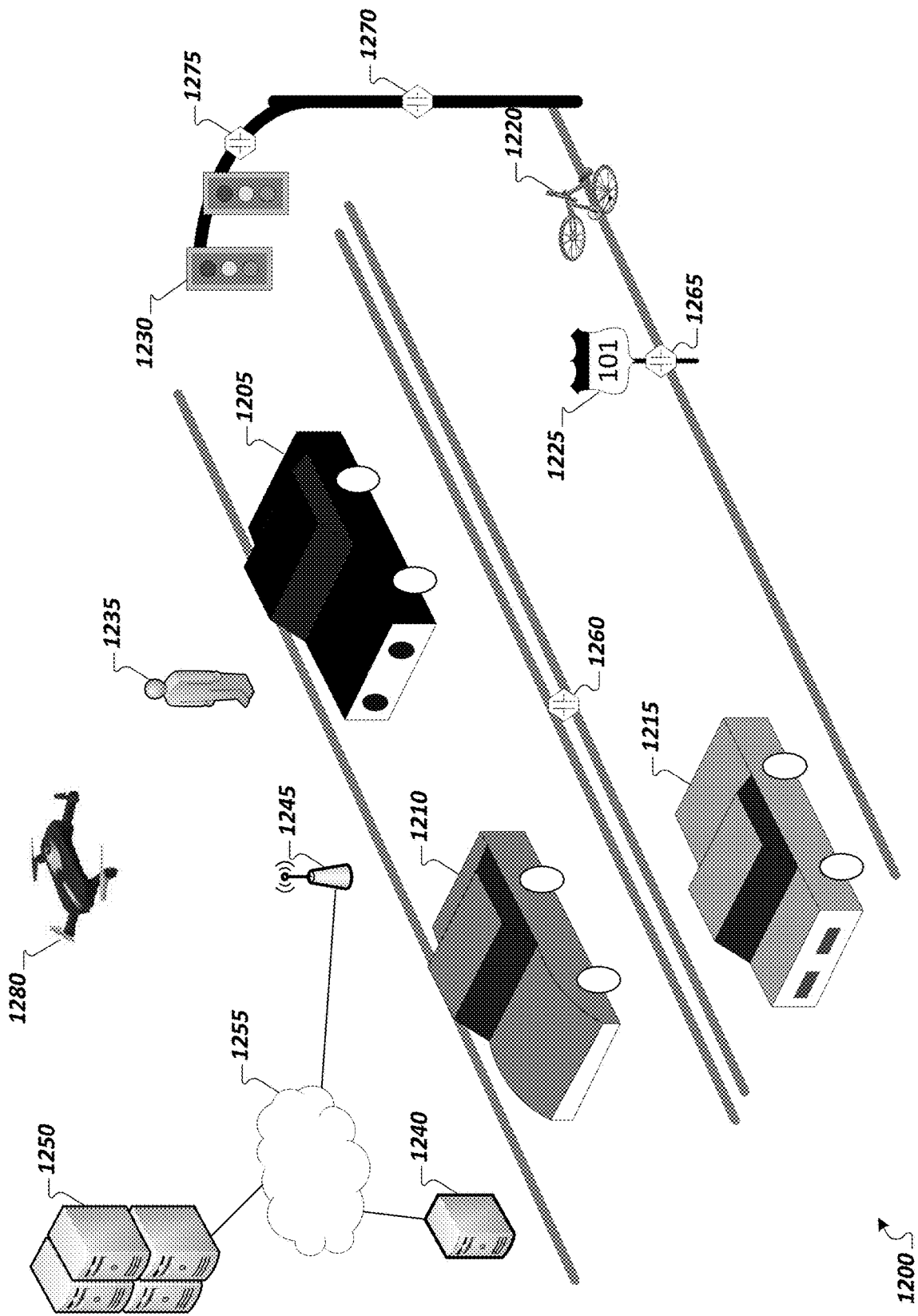
FIG. 12 is a simplified illustration showing an example autonomous driving environment in accordance with certain embodiments.

FIG. 12 is a simplified illustration 1200 showing an example autonomous driving environment. Vehicles (e.g., 1205, 1210, 1215, etc.) may be provided with varying levels of autonomous driving capabilities facilitated through in-vehicle computing systems with logic implemented in hardware, firmware, and/or software to enable respective autonomous driving stacks. Such autonomous driving stacks may allow vehicles to self-control or provide driver assistance to detect roadways, navigate from one point to another, detect other vehicles and road users (e.g., pedestrians (e.g., 1235), bicyclists, etc.), detect obstacles and hazards (e.g., 1220), and road conditions (e.g., traffic, road conditions, weather conditions, etc.), and adjust control and guidance of the vehicle accordingly.

In some implementations, vehicles (e.g., 1205, 1210, 1215) within the environment may be "connected" in that the in-vehicle computing systems include communication modules to support wireless communication using one or more technologies (e.g., Institute of Electrical and Electronics Engineers (IEEE) 802.11 communications (e.g., WiFi), cellular data networks (e.g., 3rd Generation Partnership Project (3GPP) networks, Global System for Mobile Communication (GSM), general packet radio service, code division multiple access (CDMA), etc.), Bluetooth, millimeter wave (mmWave), ZigBee, Z-Wave, etc.), allowing the in-vehicle computing systems to connect to and communicate with other computing systems, such as the in-vehicle computing systems of other vehicles or supporting infrastructure. For instance, in some implementations, vehicles (e.g., 1205, 1210, 1215) may communicate with computing systems providing sensors, data, and services in support of the vehicles' autonomous driving capabilities. For instance, as shown in the illustrative example of FIG. 12, supporting drones 1280 (e.g., ground-based and/or aerial), roadside computing devices (e.g., 1240), various external (to the vehicle, or "extraneous") sensor devices (e.g., 1260, 1265, 1270, 1275, etc.), and other devices may be provided as autonomous driving infrastructure separate from the computing systems, sensors, and logic implemented on the vehicles (e.g., 1205, 1210, 1215) to support and improve autonomous driving results provided through the vehicles, among other examples. Vehicles may also communicate with other connected vehicles over wireless communication channels to share data and coordinate movement within an autonomous driving environment, among other example communications.

As illustrated in the example of FIG. 12, autonomous driving infrastructure may incorporate a variety of different systems. Such systems may vary depending on the location, with more developed roadways (e.g., roadways controlled by specific municipalities or toll authorities, roadways in urban areas, sections of roadways known to be problematic for autonomous vehicles, etc.) having a greater number or more advanced supporting infrastructure devices than other sections of roadway, etc. For instance, supplemental sensor devices (e.g., 1260, 1265, 1270, 1275) may be provided, which include sensors for observing portions of roadways and vehicles moving within the environment and generating corresponding data describing or embodying the observations of the sensors. As examples, sensor devices may be embedded within the roadway itself (e.g., sensor 1260), on roadside or overhead signage (e.g., sensor 1265 on sign 1225), sensors (e.g., 1270, 1275) attached to electronic roadside equipment or fixtures (e.g., traffic lights (e.g., 1230), electronic road signs, electronic billboards, etc.), dedicated road side units (e.g., 1240), among other examples. Sensor devices may also include communication capabilities to communicate their collected sensor data directly to nearby connected vehicles or to fog- or cloud-based computing systems (e.g., 1240, 1250). Vehicles may obtain sensor data collected by external sensor devices (e.g., 1260, 1265, 1270, 1275, 1280), or data embodying observations or recommendations generated by other systems (e.g., 1240, 1250) based on sensor data from these sensor devices (e.g., 1260, 1265, 1270, 1275, 1280), and use this data in sensor fusion, inference, path planning, and other tasks performed by the in-vehicle autonomous driving system. In some cases, such extraneous sensors and sensor data may, in actuality, be within the vehicle, such as in the form of an after-market sensor attached to the vehicle, a personal computing device (e.g., smartphone, wearable, etc.) carried or worn by passengers of the vehicle, etc. Other road users, including pedestrians, bicycles, drones, electronic scooters, etc., may also be provided with or carry sensors to generate sensor data describing an autonomous driving environment, which may be used and consumed by autonomous vehicles, cloud- or fog-based support systems (e.g., 1240, 1250), other sensor devices (e.g., 1260, 1265, 1270, 1275, 1280), among other examples.

As autonomous vehicle systems may possess varying levels of functionality and sophistication, support infrastructure may be called upon to supplement not only the sensing capabilities of some vehicles, but also the computer and machine learning functionality enabling autonomous driving functionality of some vehicles. For instance, compute resources and autonomous driving logic used to facilitate machine learning model training and use of such machine learning models may be provided on the in-vehicle computing systems entirely or partially on both the in-vehicle systems and some external systems (e.g., 1240, 1250). For instance, a connected vehicle may communicate with roadside units, edge systems, or cloud-based devices (e.g., 1240) local to a particular segment of roadway, with such devices (e.g., 1240) capable of providing data (e.g., sensor data aggregated from local sensors (e.g., 1260, 1265, 1270, 1275, 1280) or data reported from sensors of other vehicles), performing computations (as a service) on data provided by a vehicle to supplement the capabilities native to the vehicle, and/or push information to passing or approaching vehicles (e.g., based on sensor data collected at the device 1240 or from nearby sensor devices, etc.). A connected vehicle (e.g., 1205, 1210, 1215) may also or instead communicate with cloud-based computing systems (e.g., 1250), which may provide similar memory, sensing, and computational resources to enhance those available at the vehicle. For instance, a cloud-based system (e.g., 1250) may collect sensor data from a variety of devices in one or more locations and utilize this data to build and/or train machine-learning models which may be used at the cloud-based system (to provide results to various vehicles (e.g., 1205, 1210, 1215) in communication with the cloud-based system 1250, or to push to vehicles for use by their in-vehicle systems, among other example implementations. Access points (e.g., 1245), such as cell-phone towers, road-side units, network access points mounted to various roadway infrastructure, access points provided by neighboring vehicles or buildings, and other access points, may be provided within an environment and used to facilitate communication over one or more local or wide area networks (e.g., 1255) between cloud-based systems (e.g., 1250) and various vehicles (e.g., 1205, 1210, 1215). Through such infrastructure and computing systems, it should be appreciated that the examples, features, and solutions discussed herein may be performed entirely by one or more of such in-vehicle computing systems, fog-based or edge computing devices, or cloud-based computing systems, or by combinations of the foregoing through communication and cooperation between the systems.

In general, "servers," "clients," "computing devices," "network elements," "hosts," "platforms", "sensor devices," "edge device," "autonomous driving systems", "autonomous vehicles", "fog-based system", "cloud-based system", and "systems" generally, etc. discussed herein can include electronic computing devices operable to receive, transmit, process, store, or manage data and information associated with an autonomous driving environment. As used in this document, the term "computer," "processor," "processor device," or "processing device" is intended to encompass any suitable processing apparatus, including central processing units (CPUs), graphical processing units (GPUs), application specific integrated circuits (ASICs), field programmable gate arrays (FPGAs), digital signal processors (DSPs), tensor processors and other matrix arithmetic processors, among other examples. For example, elements shown as single devices within the environment may be implemented using a plurality of computing devices and processors, such as server pools including multiple server computers. Further, any, all, or some of the computing devices may be adapted to execute any operating system, including Linux, UNIX, Microsoft Windows, Apple OS, Apple iOS, Google Android, Windows Server, etc., as well as virtual machines adapted to virtualize execution of a particular operating system, including customized and proprietary operating systems.

Any of the flows, methods, processes (or portions thereof) or functionality of any of the various components described herein or illustrated in the FIGS. may be performed by any suitable computing logic, such as one or more modules, engines, blocks, units, models, systems, or other suitable computing logic. Reference herein to a "module", "engine", "block", "unit", "model", "system" or "logic" may refer to hardware, firmware, software and/or combinations of each to perform one or more functions. As an example, a module, engine, block, unit, model, system, or logic may include one or more hardware components, such as a micro-controller or processor, associated with a non-transitory medium to store code adapted to be executed by the micro-controller or processor. Therefore, reference to a module, engine, block, unit, model, system, or logic, in one embodiment, may refers to hardware, which is specifically configured to recognize and/or execute the code to be held on a non-transitory medium. Furthermore, in another embodiment, use of module, engine, block, unit, model, system, or logic refers to the non-transitory medium including the code, which is specifically adapted to be executed by the microcontroller or processor to perform predetermined operations. And as can be inferred, in yet another embodiment, a module, engine, block, unit, model, system, or logic may refer to the combination of the hardware and the non-transitory medium. In various embodiments, a module, engine, block, unit, model, system, or logic may include a microprocessor or other processing element operable to execute software instructions, discrete logic such as an application specific integrated circuit (ASIC), a programmed logic device such as a field programmable gate array (FPGA), a memory device containing instructions, combinations of logic devices (e.g., as would be found on a printed circuit board), or other suitable hardware and/or software. A module, engine, block, unit, model, system, or logic may include one or more gates or other circuit components, which may be implemented by, e.g., transistors. In some embodiments, a module, engine, block, unit, model, system, or logic may be fully embodied as software. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices. Furthermore, logic boundaries that are illustrated as separate commonly vary and potentially overlap. For example, a first and second module (or multiple engines, blocks, units, models, systems, or logics) may share hardware, software, firmware, or a combination thereof, while potentially retaining some independent hardware, software, or firmware.

Figure 13:
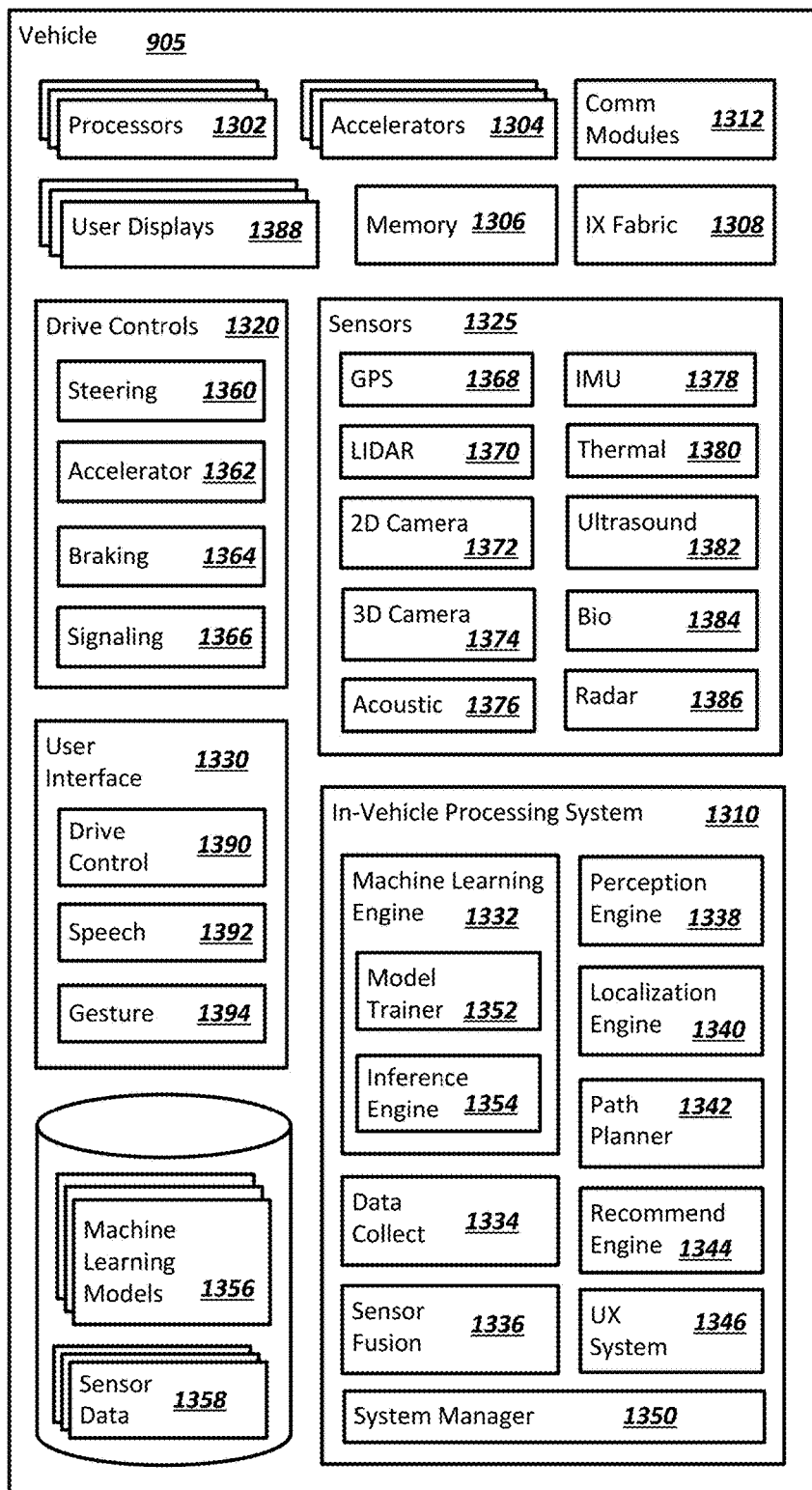
FIG. 13 is a simplified block diagram illustrating an example implementation of a vehicle (and corresponding in-vehicle computing system) equipped with autonomous driving functionality in accordance with certain embodiments.
Figure 13:
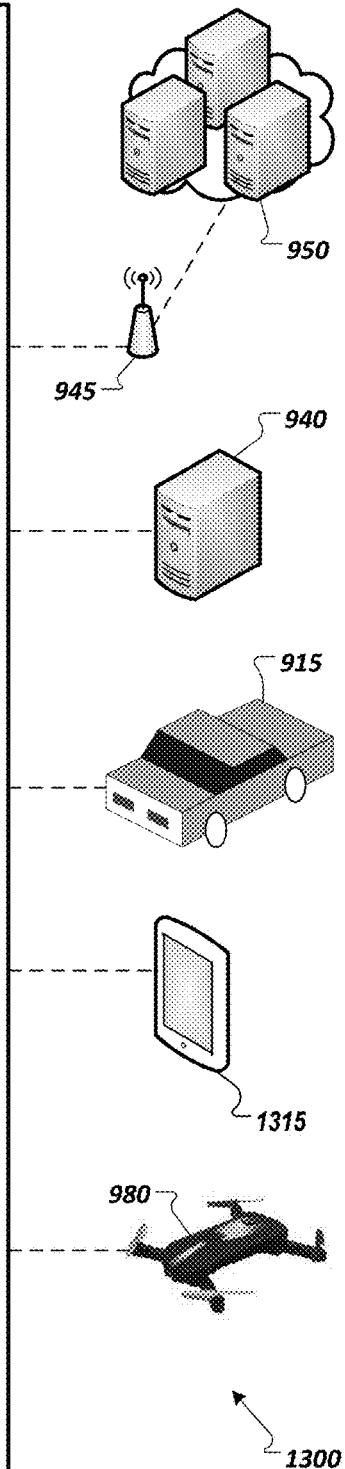

With reference now to FIG. 13, a simplified block diagram 1300 is shown illustrating an example implementation of a vehicle (and corresponding in-vehicle computing system) 1205 equipped with autonomous driving functionality. In one example, a vehicle 1205 may be equipped with one or more processors 1302, such as central processing units (CPUs), graphical processing units (GPUs), application specific integrated circuits (ASICs), field programmable gate arrays (FPGAs), digital signal processors (DSPs), tensor processors and other matrix arithmetic processors, among other examples. Such processors 1302 may be coupled to or have integrated hardware accelerator devices (e.g., 1304), which may be provided with hardware to accelerate certain processing and memory access functions, such as functions relating to machine learning inference or training, processing of particular sensor data (e.g., camera image data, LIDAR point clouds, etc.), performing certain arithmetic functions pertaining to autonomous driving (e.g., matrix arithmetic, convolutional arithmetic, etc.), among other examples. One or more memory elements (e.g., 1306) may be provided to store machine-executable instructions implementing all or a portion of any one of the modules or sub-modules of an autonomous driving stack implemented on the vehicle, as well as storing machine learning models (e.g., 1356), sensor data (e.g., 1358), and other data received, generated, or used in connection with autonomous driving functionality to be performed by the vehicle (or used in connection with the examples and solutions discussed herein). Various communication modules (e.g., 1312) may also be provided, implemented in hardware circuitry and/or software to implement communication capabilities used by the vehicle's system to communicate with other extraneous computing systems over one or more network channels employing one or more network communication technologies. These various processors 1302, accelerators 1304, memory devices 1306, and network communication modules 1312, may be interconnected on the vehicle system through one or more interconnect fabrics or links (e.g., 1308), such as fabrics utilizing technologies such as a Peripheral Component Interconnect Express (PCIe), Ethernet, OpenCAPI™, Gen-Z™, UPI, Universal Serial Bus, (USB), Cache Coherent Interconnect for Accelerators (CCIX™), Advanced Micro Device™'s (AMD™) Infinity™, Common Communication Interface (CCI), or Qualcomm™'s Centrig™ interconnect, among others.

Continuing with the example of FIG. 13, an example vehicle (and corresponding in-vehicle computing system) 1205 may include an in-vehicle processing system 1310, driving controls (e.g., 1320), sensors (e.g., 1325), and user/passenger interface(s) (e.g., 1330), among other example modules implemented functionality of the autonomous vehicle in hardware and/or software. For instance, an in-vehicle processing system 1310, in some implementations, may implement all or a portion of an autonomous driving stack and process flow (e.g., as shown and discussed in the example of FIG. 5). A machine learning engine 1332 may be provided to utilize various machine learning models (e.g., 1356) provided at the vehicle 1205 in connection with one or more autonomous functions and features provided and implemented at or for the vehicle, such as discussed in the examples herein. Such machine learning models 1356 may include artificial neural network models, convolutional neural networks, decision tree-based models, support vector machines (SVMs), Bayesian models, deep learning models, and other example models. In some implementations, an example machine learning engine 1332 may include one or more model trainer engines 1352 to participate in training (e.g., initial training, continuous training, etc.) of one or more of the machine learning models 1356. One or more inference engines 1354 may also be provided to utilize the trained machine learning models 1356 to derive various inferences, predictions, classifications, and other results.

The machine learning engine(s) 1332 provided at the vehicle may be utilized to support and provide results for use by other logical components and modules of the in-vehicle processing system 1310 implementing an autonomous driving stack and other autonomous-driving-related features. For instance, a data collection module 1334 may be provided with logic to determine sources from which data is to be collected (e.g., for inputs in the training or use of various machine learning models 1356 used by the vehicle). For instance, the particular source (e.g., internal sensors (e.g., 1325) or extraneous sources (e.g., 1215, 1240, 1250, 1280, 1315, etc.)) may be selected, as well as the frequency and fidelity at which the data is sampled is selected. In some cases, such selections and configurations may be made at least partially autonomously by the data collection module 1334 using one or more corresponding machine learning models (e.g., to collect data as appropriate given a particular detected scenario).

A sensor fusion module 1336 may also be used to govern the use and processing of the various sensor inputs utilized by the machine learning engine 1332 and other modules (e.g., 1338, 1340, 1342, 1344, 1346, etc.) of the in-vehicle processing system. One or more sensor fusion modules (e.g., 1336) may be provided, which may derive an output from multiple sensor data sources (e.g., on the vehicle or extraneous to the vehicle). The sources may be homogenous or heterogeneous types of sources (e.g., multiple inputs from multiple instances of a common type of sensor, or from instances of multiple different types of sensors). An example sensor fusion module 1336 may apply direct fusion, indirect fusion, among other example sensor fusion techniques. The output of the sensor fusion may, in some cases by fed as an input (along with potentially additional inputs) to another module of the in-vehicle processing system and/or one or more machine learning models in connection with providing autonomous driving functionality or other functionality, such as described in the example solutions discussed herein.

A perception engine 1338 may be provided in some examples, which may take as inputs various sensor data (e.g., 1358) including data, in some instances, from extraneous sources and/or sensor fusion module 1336 to perform object recognition and/or tracking of detected objects, among other example functions corresponding to autonomous perception of the environment encountered (or to be encountered) by the vehicle 1205. Perception engine 1338 may perform object recognition from sensor data inputs using deep learning, such as through one or more convolutional neural networks and other machine learning models 1356. Object tracking may also be performed to autonomously estimate, from sensor data inputs, whether an object is moving and, if so, along what trajectory. For instance, after a given object is recognized, a perception engine 1338 may detect how the given object moves in relation to the vehicle. Such functionality may be used, for instance, to detect objects, such as other vehicles, pedestrians, wildlife, cyclists, etc. moving within an environment, which may affect the path of the vehicle on a roadway, among other example uses.

A localization engine 1340 may also be included within an in-vehicle processing system 1310 in some implementation. In some cases, localization engine 1340 may be implemented as a sub-component of a perception engine 1338. The localization engine 1340 may also make use of one or more machine learning models 1356 and sensor fusion (e.g., of LIDAR and GPS data, etc.) to determine a high confidence location of the vehicle and the space it occupies within a given physical space (or "environment").

A vehicle 1205 may further include a path planner 1342, which may make use of the results of various other modules, such as data collection (e.g., 1334), sensor fusion (e.g., 1336), perception engine (e.g., 1338,) and localization engine (e.g., 1340) among others (e.g., recommendation engine 1344) to determine a path plan and/or action plan for the vehicle, which may be used by drive controls (e.g., 1320)

to control the driving of the vehicle 1205 within an environment. For instance, a path planner 1342 may utilize these inputs and one or more machine learning models to determine probabilities of various events within a driving environment to determine effective real-time plans to act within the environment.

In some implementations, the vehicle 1205 may include one or more recommendation engines 1344 to generate various recommendations from sensor data generated by the vehicle's 1205 own sensors (e.g., 1325) as well as sensor data from extraneous sensors (e.g., sensor devices 1215, 1280, 1315, etc.). Some recommendations may be determined by the recommendation engine 1344, which may be provided as inputs to other components of the vehicle's autonomous driving stack to influence determinations that are made by these components. For instance, a recommendation may be determined, which, when considered by a path planner 1342, causes the path planner 1342 to deviate from decisions or plans it would ordinarily otherwise determine, but for the recommendation. Recommendations may also be generated by recommendation engines (e.g., 1344) based on considerations of passenger comfort and experience. In some cases, interior features within the vehicle may be manipulated predictively and autonomously based on these recommendations (which are determined from sensor data (e.g., 1358) captured by the vehicle's sensors and/or extraneous sensors, etc.

As introduced above, some vehicle implementations may include user/passenger experience engines (e.g., 1346), which may utilize sensor data and outputs of other modules within the vehicle's autonomous driving stack to cause driving maneuvers and changes to the vehicle's cabin environment to enhance the experience of passengers within the vehicle based on the observations captured by the sensor data (e.g., 1358). In some instances, aspects of user interfaces (e.g., 1330) provided on the vehicle to enable users to interact with the vehicle and its autonomous driving system may be enhanced. In some cases, informational presentations may be generated and provided through user displays (e.g., audio, visual, and/or tactile presentations) to help affect and improve passenger experiences within a vehicle (e.g., 1205) among other example uses.

In some cases, a system manager 1350 may also be provided, which monitors information collected by various sensors on the vehicle to detect issues relating to the performance of a vehicle's autonomous driving system. For instance, computational errors, sensor outages and issues, availability and quality of communication channels (e.g., provided through communication modules 1312), vehicle system checks (e.g., issues relating to the motor, transmission, battery, cooling system, electrical system, tires, etc.), or other operational events may be detected by the system manager 1350. Such issues may be identified in system report data generated by the system manager 1350, which may be utilized, in some cases, as inputs to machine learning models 1356 and related autonomous driving modules (e.g., 1332, 1334, 1336, 1338, 1340, 1342, 1344, 1346, etc.) to enable vehicle system health and issues to also be considered along with other information collected in sensor data 1358 in the autonomous driving functionality of the vehicle 1205.

In some implementations, an autonomous driving stack of a vehicle 1205 may be coupled with drive controls 1320 to affect how the vehicle is driven, including steering controls (e.g., 1360), accelerator/throttle controls (e.g., 1362), braking controls (e.g., 1364), signaling controls (e.g., 1366), among other examples. In some cases, a vehicle may also be controlled wholly or partially based on user inputs. For instance, user interfaces (e.g., 1330), may include driving controls (e.g., a physical or virtual steering wheel, accelerator, brakes, clutch, etc.) to allow a human driver to take control from the autonomous driving system (e.g., in a handover or following a driver assist action). Other sensors may be utilized to accept user/passenger inputs, such as speech detection 1392, gesture detection cameras 1394, and other examples. User interfaces (e.g., 1330) may capture the desires and intentions of the passenger-users and the autonomous driving stack of the vehicle 1205 may consider these as additional inputs in controlling the driving of the vehicle (e.g., drive controls 1320). In some implementations, drive controls may be governed by external computing systems, such as in cases where a passenger utilizes an external device (e.g., a smartphone or tablet) to provide driving direction or control, or in cases of a remote valet service, where an external driver or system takes over control of the vehicle (e.g., based on an emergency event), among other example implementations.

As discussed above, the autonomous driving stack of a vehicle may utilize a variety of sensor data (e.g., 1358) generated by various sensors provided on and external to the vehicle. As an example, a vehicle 1205 may possess an array of sensors 1325 to collect various information relating to the exterior of the vehicle and the surrounding environment, vehicle system status, conditions within the vehicle, and other information usable by the modules of the vehicle's processing system 1310. For instance, such sensors 1325 may include global positioning (GPS) sensors 1368, light detection and ranging (LIDAR) sensors 1370, two-dimensional (2D) cameras 1372, three-dimensional (3D) or stereo cameras 1374, acoustic sensors 1376, inertial measurement unit (IMU) sensors 1378, thermal sensors 1380, ultrasound sensors 1382, bio sensors 1384 (e.g., facial recognition, voice recognition, heart rate sensors, body temperature sensors, emotion detection sensors, etc.), radar sensors 1386, weather sensors (not shown), among other example sensors. Sensor data 1358 may also (or instead) be generated by sensors that are not integrally coupled to the vehicle, including sensors on other vehicles (e.g., 1215) (which may be communicated to the vehicle 1205 through vehicle-to-vehicle communications or other techniques), sensors on ground-based or aerial drones 1280, sensors of user devices 1315 (e.g., a smartphone or wearable) carried by human users inside or outside the vehicle 1205, and sensors mounted or provided with other roadside elements, such as a roadside unit (e.g., 1240), road sign, traffic light, streetlight, etc. Sensor data from such extraneous sensor devices may be provided directly from the sensor devices to the vehicle or may be provided through data aggregation devices or as results generated based on these sensors by other computing systems (e.g., 1240, 1250), among other example implementations.

In some implementations, an autonomous vehicle system 1205 may interface with and leverage information and services provided by other computing systems to enhance, enable, or otherwise support the autonomous driving functionality of the device 1205. In some instances, some autonomous driving features (including some of the example solutions discussed herein) may be enabled through services, computing logic, machine learning models, data, or other resources of computing systems external to a vehicle. When such external systems are unavailable to a vehicle, it may be that these features are at least temporarily disabled. For instance, external computing systems may be provided and leveraged, which are hosted in road-side units or fog-based edge devices (e.g., 1240), other (e.g., higher-level) vehicles (e.g., 1215), and cloud-based systems 1250 (e.g., accessible through various network access points (e.g., 1245)). A roadside unit 1240 or cloud-based system 1250 (or other cooperating system, with which a vehicle (e.g., 1205) interacts may include all or a portion of the logic illustrated as belonging to an example in-vehicle processing system (e.g., 1310), along with potentially additional functionality and logic. For instance, a cloud-based computing system, road side unit 1240, or other computing system may include a machine learning engine supporting either or both model training and inference engine logic. For instance, such external systems may possess higher-end computing resources and more developed or up-to-date machine learning models, allowing these services to provide superior results to what would be generated natively on a vehicle's processing system 1310. For instance, an in-vehicle processing system 1310 may rely on the machine learning training, machine learning inference, and/or machine learning models provided through a cloud-based service for certain tasks and handling certain scenarios. Indeed, it should be appreciated that one or more of the modules discussed and illustrated as belonging to vehicle 1205 may, in some implementations, be alternatively or redundantly provided within a cloud-based, fog-based, or other computing system supporting an autonomous driving environment.

Various embodiments herein may utilize one or more machine learning models to perform functions of the AV stack (or other functions described herein). A machine learning model may be executed by a computing system to progressively improve performance of a specific task. In some embodiments, parameters of a machine learning model may be adjusted during a training phase based on training data. A trained machine learning model may then be used during an inference phase to make predictions or decisions based on input data.

The machine learning models described herein may take any suitable form or utilize any suitable techniques. For example, any of the machine learning models may utilize supervised learning, semi-supervised learning, unsupervised learning, or reinforcement learning techniques.

In supervised learning, the model may be built using a training set of data that contains both the inputs and corresponding desired outputs. Each training instance may include one or more inputs and a desired output. Training may include iterating through training instances and using an objective function to teach the model to predict the output for new inputs. In semi-supervised learning, a portion of the inputs in the training set may be missing the desired outputs.

In unsupervised learning, the model may be built from a set of data which contains only inputs and no desired outputs. The unsupervised model may be used to find structure in the data (e.g., grouping or clustering of data points) by discovering patterns in the data. Techniques that may be implemented in an unsupervised learning model include, e.g., self-organizing maps, nearest-neighbor mapping, k-means clustering, and singular value decomposition.

Reinforcement learning models may be given positive or negative feedback to improve accuracy. A reinforcement learning model may attempt to maximize one or more objectives/rewards. Techniques that may be implemented in a reinforcement learning model may include, e.g., Q-learning, temporal difference (TD), and deep adversarial networks.

Various embodiments described herein may utilize one or more classification models. In a classification model, the outputs may be restricted to a limited set of values. The classification model may output a class for an input set of one or more input values. References herein to classification models may contemplate a model that implements, e.g., any one or more of the following techniques: linear classifiers (e.g., logistic regression or naïve Bayes classifier), support vector machines, decision trees, boosted trees, random forest, neural networks, or nearest neighbor.

Various embodiments described herein may utilize one or more regression models. A regression model may output a numerical value from a continuous range based on an input set of one or more values. References herein to regression models may contemplate a model that implements, e.g., any one or more of the following techniques (or other suitable techniques): linear regression, decision trees, random forest, or neural networks.

Figure 14:
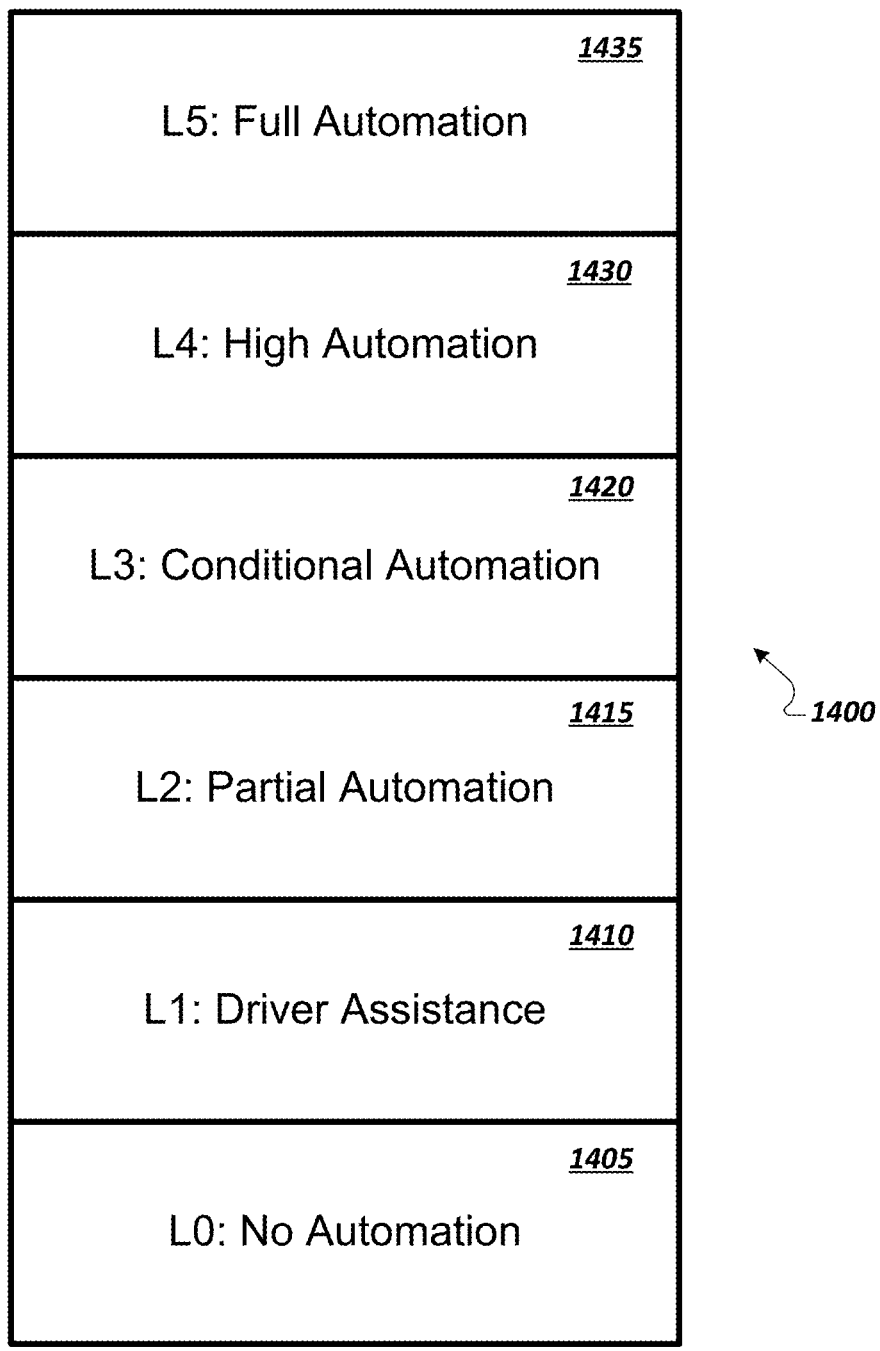
FIG. 14 is a simplified block diagram illustrating example levels of autonomous driving which may be supported in various vehicles (e.g., by their corresponding in-vehicle computing systems) in accordance with certain embodiments.

Turning to FIG. 14, a simplified block diagram 1400 is shown illustrating example levels of autonomous driving, which may be supported in various vehicles (e.g., by their corresponding in-vehicle computing systems). For instance, a range of levels may be defined (e.g., L0-L5 (1405-1435)), with level 5 (L5) corresponding to vehicles with the highest level of autonomous driving functionality (e.g., full automation), and level 0 (L0) corresponding the lowest level of autonomous driving functionality (e.g., no automation). For instance, an L5 vehicle (e.g., 1435) may possess a fully-autonomous computing system capable of providing autonomous driving performance in every driving scenario equal to or better than would be provided by a human driver, including in extreme road conditions and weather. An L4 vehicle (e.g., 1430) may also be considered fully-autonomous capable of performing safety-critical driving functions and effectively monitoring roadway conditions throughout an entire trip from a starting location to a destination. L4 vehicles may differ from L5 vehicles, in that an L4's autonomous capabilities are defined within the limits of the vehicle's "operational design domain," which may not include all driving scenarios. L3 vehicles (e.g., 1420) provide autonomous driving functionality to completely shift safety-critical functions to the vehicle in a set of specific traffic and environment conditions, but which still expect the engagement and availability of human drivers to handle driving in all other scenarios. Accordingly, L3 vehicles may provide handover protocols to orchestrate the transfer of control from a human driver to the autonomous driving stack and back. L2 vehicles (e.g., 1415) provide driver assistance functionality, which allow the driver to occasionally disengage from physically operating the vehicle, such that both the hands and feet of the driver may disengage periodically from the physical controls of the vehicle. L1 vehicles (e.g., 1410) provide driver assistance of one or more specific functions (e.g., steering, braking, etc.), but still require constant driver control of most functions of the vehicle. L0 vehicles may be considered not autonomous—the human driver controls all of the driving functionality of the vehicle (although such vehicles may nonetheless participate passively within autonomous driving environments, such as by providing sensor data to higher level vehicles, using sensor data to enhance GPS and infotainment services within the vehicle, etc.). In some implementations, a single vehicle may support operation at multiple autonomous driving levels. For instance, a driver may control and select which supported level of autonomy is used during a given trip (e.g., L4 or a lower level). In other cases, a vehicle may autonomously toggle between levels, for instance, based on conditions affecting the roadway or the vehicle's autonomous driving system. For example, in response to detecting that one or more sensors have been compromised, an L5 or L4 vehicle may shift to a lower mode (e.g., L2 or lower) to involve a human passenger in light of the sensor issue, among other examples.

Figure 15:
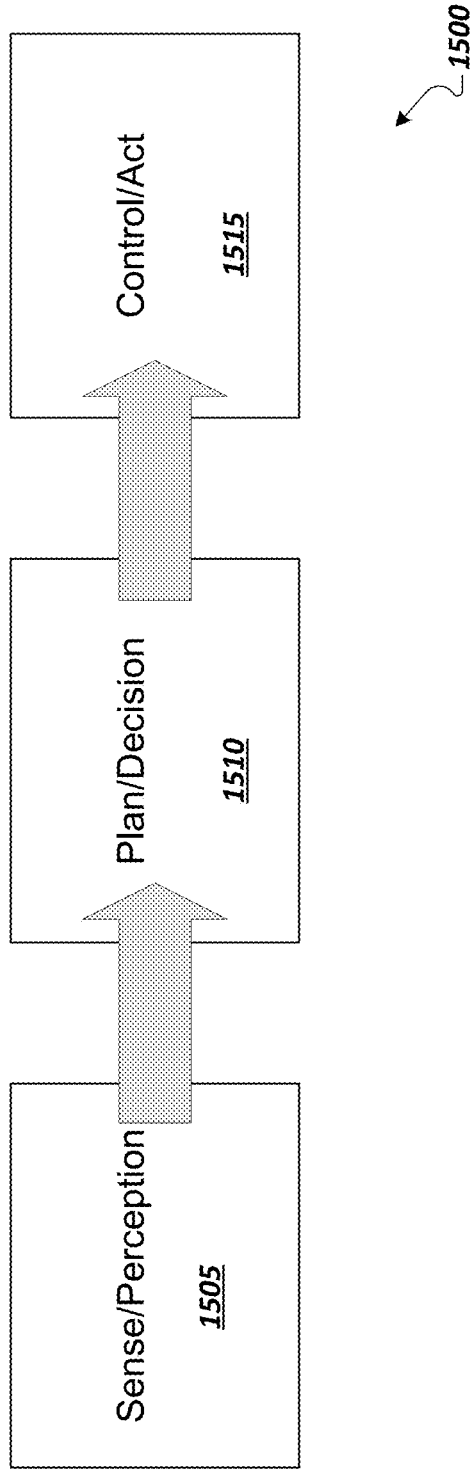
FIG. 15 is a simplified block diagram illustrating an example autonomous driving flow which may be implemented in some autonomous driving systems in accordance with certain embodiments.

FIG. 15 is a simplified block diagram 1500 illustrating an example autonomous driving flow which may be implemented in some autonomous driving systems. For instance, an autonomous driving flow implemented in an autonomous (or semi-autonomous) vehicle may include a sensing and perception stage 1505, a planning and decision stage 1510, and a control and action phase 1515. During a sensing and perception stage 1505 data is generated by various sensors and collected for use by the autonomous driving system. Data collection, in some instances, may include data filtering and receiving sensor from external sources. This stage may also include sensor fusion operations and object recognition and other perception tasks, such as localization, performed using one or more machine learning models. A planning and decision stage 1510 may utilize the sensor data and results of various perception operations to make probabilistic predictions of the roadway(s) ahead and determine a real time path plan based on these predictions. A planning and decision stage 1510 may additionally include making decisions relating to the path plan in reaction to the detection of obstacles and other events to decide on whether and what action to take to safely navigate the determined path in light of these events. Based on the path plan and decisions of the planning and decision stage 1510, a control and action stage 1515 may convert these determinations into actions, through actuators to manipulate driving controls including steering, acceleration, and braking, as well as secondary controls, such as turn signals, sensor cleaners, windshield wipers, headlights, etc.

Figure 16:
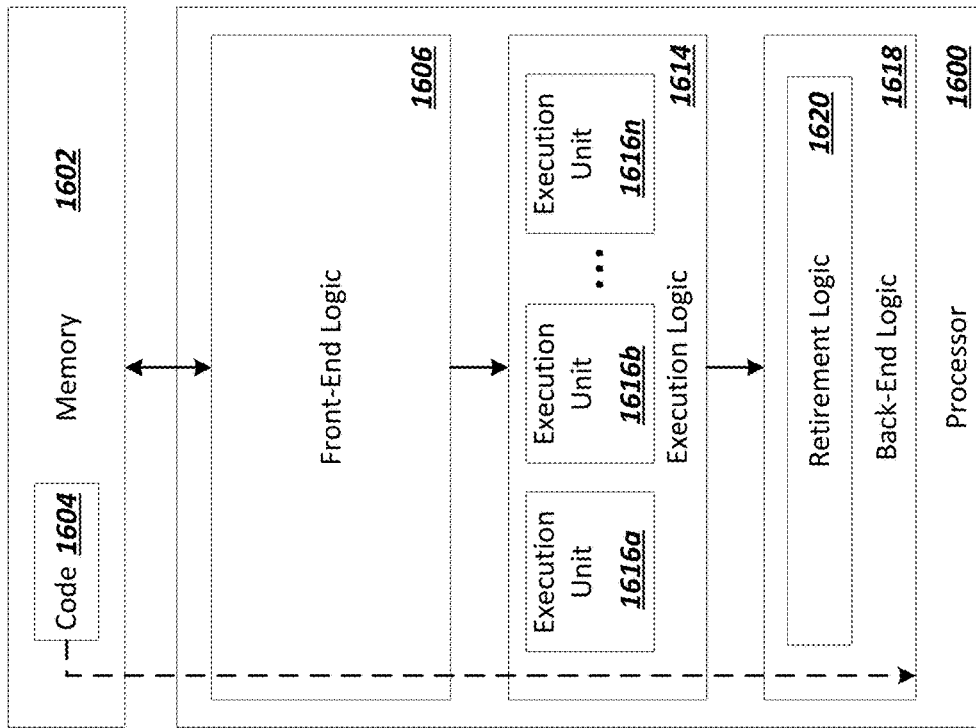
FIG. 16 is an example illustration of a processor in accordance with certain embodiments.
Figure 17:
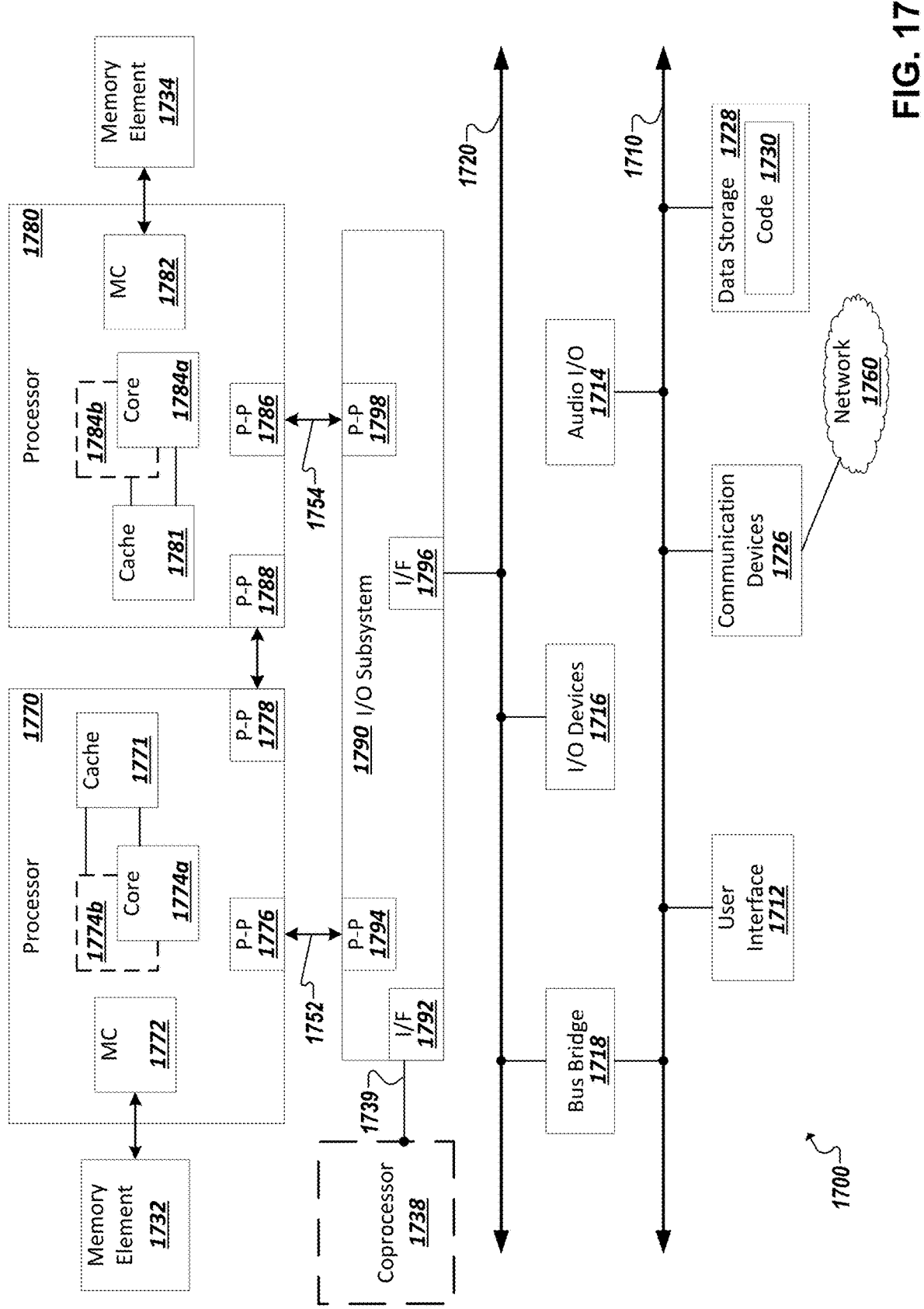
FIG. 17 illustrates a computing system that is arranged in a point-to-point (PtP) configuration in accordance with certain embodiments.

FIGS. 16-17 are block diagrams of exemplary computer architectures that may be used in accordance with embodiments disclosed herein. Other computer architecture designs known in the art for processors and computing systems may also be used. Generally, suitable computer architectures for embodiments disclosed herein can include, but are not limited to, configurations illustrated in FIGS. 16-17.

FIG. 16 is an example illustration of a processor according to an embodiment. Processor 1600 is an example of a type of hardware device that can be used in connection with the implementations above. Processor 1600 may be any type of processor, such as a microprocessor, an embedded processor, a digital signal processor (DSP), a network processor, a multi-core processor, a single core processor, or other device to execute code. Although only one processor 1600 is illustrated in FIG. 16, a processing element may alternatively include more than one of processor 1600 illustrated in FIG. 16. Processor 1600 may be a single-threaded core or, for at least one embodiment, the processor 1600 may be multi-threaded in that it may include more than one hardware thread context (or "logical processor") per core.

FIG. 16 also illustrates a memory 1602 coupled to processor 1600 in accordance with an embodiment. Memory 1602 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM).

Processor 1600 can execute any type of instructions associated with processes, processes, or operations detailed herein. Generally, processor 1600 can transform an element or an article (e.g., data) from one state or thing to another state or thing.

Code 1604, which may be one or more instructions to be executed by processor 1600, may be stored in memory 1602, or may be stored in software, hardware, firmware, or any suitable combination thereof, or in any other internal or external component, device, element, or object where appropriate and based on particular needs. In one example, processor 1600 can follow a program sequence of instructions indicated by code 1604. Each instruction enters a front-end logic 1606 and is processed by one or more decoders 1608. The decoder may generate, as its output, a micro operation such as a fixed width micro operation in a predefined format, or may generate other instructions, microinstructions, or control signals that reflect the original code instruction. Front-end logic 1606 also includes register renaming logic 1610 and scheduling logic 1612, which generally allocate resources and queue the operation corresponding to the instruction for execution.

Processor 1600 can also include execution logic 1614 having a set of execution units 1616a, 1616b, 1616n, etc. Some embodiments may include a number of execution units dedicated to specific functions or sets of functions. Other embodiments may include only one execution unit or one execution unit that can perform a particular function. Execution logic 1614 performs the operations specified by code instructions.

After completion of execution of the operations specified by the code instructions, back-end logic 1618 can retire the instructions of code 1604. In one embodiment, processor 1600 allows out of order execution but requires in order retirement of instructions. Retirement logic 1620 may take a variety of known forms (e.g., re-order buffers or the like). In this manner, processor 1600 is transformed during execution of code 1604, at least in terms of the output generated by the decoder, hardware registers and tables utilized by register renaming logic 1610, and any registers (not shown) modified by execution logic 1614.

Although not shown in FIG. 16, a processing element may include other elements on a chip with processor 1600. For example, a processing element may include memory control logic along with processor 1600. The processing element may include I/O control logic and/or may include I/O control logic integrated with memory control logic. The processing element may also include one or more caches. In some embodiments, non-volatile memory (such as flash memory or fuses) may also be included on the chip with processor 1600.

FIG. 17 illustrates a computing system 1700 that is arranged in a point-to-point (PtP) configuration according to an embodiment. In particular, FIG. 17 shows a system where processors, memory, and input/output devices are interconnected by a number of point-to-point interfaces. Generally, one or more of the computing systems described herein may be configured in the same or similar manner as computing system 1600.

Processors 1770 and 1780 may also each include integrated memory controller logic (MC) 1772 and 1782 to communicate with memory elements 1732 and 1734. In alternative embodiments, memory controller logic 1772 and 1782 may be discrete logic separate from processors 1770 and 1780. Memory elements 1732 and/or 1734 may store various data to be used by processors 1770 and 1780 in achieving operations and functionality outlined herein.

Processors 1770 and 1780 may be any type of processor, such as those discussed in connection with other figures.

Processors 1770 and 1780 may exchange data via a point-to-point (PtP) interface 1750 using point-to-point interface circuits 1778 and 1788, respectively. Processors 1770 and 1780 may each exchange data with a chipset 1790 via individual point-to-point interfaces 1752 and 1754 using point-to-point interface circuits 1776, 1786, 1794, and 1798. Chipset 1790 may also exchange data with a co-processor 1738, such as a high-performance graphics circuit, machine learning accelerator, or other co-processor 1738, via an interface 1739, which could be a PtP interface circuit. In alternative embodiments, any or all of the PtP links illustrated in FIG. 17 could be implemented as a multi-drop bus rather than a PtP link.

Chipset 1790 may be in communication with a bus 1720 via an interface circuit 1796. Bus 1720 may have one or more devices that communicate over it, such as a bus bridge 1718 and I/O devices 1716. Via a bus 1710, bus bridge 1718 may be in communication with other devices such as a user interface 1712 (such as a keyboard, mouse, touchscreen, or other input devices), communication devices 1726 (such as modems, network interface devices, or other types of communication devices that may communicate through a computer network 1760), audio I/O devices 1714, and/or a data storage device 1728. Data storage device 1728 may store code 1730, which may be executed by processors 1770 and/or 1780. In alternative embodiments, any portions of the bus architectures could be implemented with one or more PtP links.

The computer system depicted in FIG. 17 is a schematic illustration of an embodiment of a computing system that may be utilized to implement various embodiments discussed herein. It will be appreciated that various components of the system depicted in FIG. 17 may be combined in a system-on-a-chip (SoC) architecture or in any other suitable configuration capable of achieving the functionality and features of examples and implementations provided herein.

While some of the systems and solutions described and illustrated herein have been described as containing or being associated with a plurality of elements, not all elements explicitly illustrated or described may be utilized in each alternative implementation of the present disclosure. Additionally, one or more of the elements described herein may be located external to a system, while in other instances, certain elements may be included within or as a portion of one or more of the other described elements, as well as other elements not described in the illustrated implementation. Further, certain elements may be combined with other components, as well as used for alternative or additional purposes in addition to those purposes described herein.

The following examples pertain to embodiments in accordance with this Specification. Example 1 is an apparatus a memory to store an observed trajectory of a pedestrian, the observed trajectory comprising a plurality of observed locations of the pedestrian over a first plurality of timesteps; and a processor coupled to the memory, the processor comprising circuitry, the processor to generate a predicted trajectory of the pedestrian, the predicted trajectory comprising a plurality of predicted locations of the pedestrian over the first plurality of timesteps and over a second plurality of timesteps occurring after the first plurality of timesteps; determine a likelihood of the predicted trajectory based on a comparison of the plurality of predicted locations of the pedestrian over the first plurality of timesteps and the plurality of observed locations of the pedestrian over the first plurality of timesteps; and responsive to the determined likelihood of the predicted trajectory, provide information associated with the predicted trajectory to a vehicle to warn the vehicle of a potential collision with the pedestrian.

Example 2 may include the subject matter of example 1, wherein the vehicle does not have a line of sight with the pedestrian when the information associated with the predicted trajectory is provided by the processor.

Example 3 may include the subject matter of any of examples 1-2, wherein the information associated with the predicted trajectory comprises the predicted trajectory.

Example 4 may include the subject matter of any of examples 1-3, wherein the processor is further to select the predicted trajectory from among a plurality of predicted trajectories for the pedestrian based on the determined likelihood of the predicted trajectory.

Example 5 may include the subject matter of any of examples 1-4, wherein the comparison comprises an evaluation of values of a plurality of gaussian distributions at the plurality of predicted locations of the pedestrian over the first plurality of timesteps, wherein the plurality of gaussian distributions have respective means at the plurality of observed locations of the pedestrian over the first plurality of timesteps.

Example 6 may include the subject matter of any of examples 1-5, wherein the processor is further to generate a path from a start position to an inferred goal position of the pedestrian using random sampling and generate the predicted trajectory of the pedestrian based on the generated path.

Example 7 may include the subject matter of example 6, wherein the random sampling is generated utilizing a Rapidly-exploring Random Tree Star.

Example 8 may include the subject matter of any of examples 1-7, wherein the processor is further to determine locations of a plurality of obstacles of an intersection, an obstacle representing an area of the intersection that is not traversable by the pedestrian; and generate the predicted trajectory of the pedestrian based on the plurality of obstacles of the intersection.

Example 9 may include the subject matter of any of examples 1-8, wherein the determination of the likelihood of the predicted trajectory is further based on historical information indicating how often pedestrians travel to a goal position of the predicted trajectory relative to other goal positions.

Example 10 may include the subject matter of any of examples 1-9, wherein the predicted trajectory of the pedestrian is based at least in part on an observed motion profile of the pedestrian.

Example 11 may include the subject matter of any of examples 1-10, wherein the predicted trajectory of the pedestrian is based at least in part on a state of a traffic light of an intersection.

Example 12 may include the subject matter of any of examples 1-11, further comprising further comprising one or more of a battery communicatively coupled to the processor, a display communicatively coupled to the processor, or a network interface communicatively coupled to the processor.

Example 13 is method comprising storing an observed trajectory of a pedestrian, the observed trajectory comprising a plurality of observed locations of the pedestrian over a first plurality of timesteps; generating a predicted trajectory of the pedestrian, the predicted trajectory comprising a plurality of predicted locations of the pedestrian over the first plurality of timesteps and over a second plurality of timesteps occurring after the first plurality of timesteps; determining a likelihood of the predicted trajectory based on a comparison of the plurality of predicted locations of the pedestrian over the first plurality of timesteps and the plurality of observed locations of the pedestrian over the first plurality of timesteps; and responsive to the determined likelihood of the predicted trajectory, providing information associated with the predicted trajectory to a vehicle to warn the vehicle of a potential collision with the pedestrian.

Example 14 may include the subject matter of example 13, wherein the vehicle does not have a line of sight with the pedestrian when the information associated with the predicted trajectory is provided.

Example 15 may include the subject matter of any of examples 13-14, wherein the information associated with the predicted trajectory comprises the predicted trajectory.

Example 16 may include the subject matter of any of examples 13-15, wherein the method further comprises selecting the predicted trajectory from among a plurality of predicted trajectories for the pedestrian based on the determined likelihood of the predicted trajectory.

Example 17 may include the subject matter of any of examples 13-16, wherein the comparison comprises an evaluation of values of a plurality of gaussian distributions at the plurality of predicted locations of the pedestrian over the first plurality of timesteps, wherein the plurality of gaussian distributions have respective means at the plurality of observed locations of the pedestrian over the first plurality of timesteps.

Example 18 may include the subject matter of any of examples 13-17, wherein the method further comprises generating a path from a start position to an inferred goal position of the pedestrian using random sampling and generating the predicted trajectory of the pedestrian based on the generated path.

Example 19 may include the subject matter of example 18, wherein the random sampling is generated utilizing a Rapidly-exploring Random Tree Star.

Example 20 may include the subject matter of any of examples 13-19, wherein the method further comprises determining locations of a plurality of obstacles of an intersection, an obstacle representing an area of the intersection that is not traversable by the pedestrian; and generating the predicted trajectory of the pedestrian based on the plurality of obstacles of the intersection.

Example 21 may include the subject matter of any of examples 13-20, wherein the determination of the likelihood of the predicted trajectory is further based on historical information indicating how often pedestrians travel to a goal position of the predicted trajectory relative to other goal positions.

Example 22 may include the subject matter of any of examples 13-21, wherein the predicted trajectory of the pedestrian is based at least in part on an observed motion profile of the pedestrian.

Example 23 may include the subject matter of any of examples 13-22, wherein the predicted trajectory of the pedestrian is based at least in part on a state of a traffic light of an intersection.

Example 24 is at least one non-transitory machine readable storage medium having instructions stored thereon, the instructions when executed by a machine to cause the machine to store an observed trajectory of a pedestrian, the observed trajectory comprising a plurality of observed locations of the pedestrian over a first plurality of timesteps; generate a predicted trajectory of the pedestrian, the predicted trajectory comprising a plurality of predicted locations of the pedestrian over the first plurality of timesteps and over a second plurality of timesteps occurring after the first plurality of timesteps; determine a likelihood of the predicted trajectory based on a comparison of the plurality of predicted locations of the pedestrian over the first plurality of timesteps and the plurality of observed locations of the pedestrian over the first plurality of timesteps; and responsive to the determined likelihood of the predicted trajectory, provide information associated with the predicted trajectory to a vehicle to warn the vehicle of a potential collision with the pedestrian.

Example 25 may include the subject matter of example 24, wherein the vehicle does not have a line of sight with the pedestrian when the information associated with the predicted trajectory is provided.

Example 26 may include the subject matter of any of examples 24-25, wherein the information associated with the predicted trajectory comprises the predicted trajectory.

Example 27 may include the subject matter of any of examples 24-26, wherein the instructions when executed by a machine to cause the machine to select the predicted trajectory from among a plurality of predicted trajectories for the pedestrian based on the determined likelihood of the predicted trajectory.

Example 28 may include the subject matter of any of examples 24-27, wherein the comparison comprises an evaluation of values of a plurality of gaussian distributions at the plurality of predicted locations of the pedestrian over the first plurality of timesteps, wherein the plurality of gaussian distributions have respective means at the plurality of observed locations of the pedestrian over the first plurality of timesteps.

Example 29 may include the subject matter of any of examples 24-28, wherein the instructions when executed by a machine to cause the machine to generate a path from a start position to an inferred goal position of the pedestrian using random sampling and generate the predicted trajectory of the pedestrian based on the generated path.

Example 30 may include the subject matter of example 29, wherein the random sampling is generated utilizing a Rapidly-exploring Random Tree Star.

Example 31 may include the subject matter of any of examples 24-30, wherein the instructions when executed by a machine to cause the machine to determine locations of a plurality of obstacles of an intersection, an obstacle representing an area of the intersection that is not traversable by the pedestrian; and generate the predicted trajectory of the pedestrian based on the plurality of obstacles of the intersection.

Example 32 may include the subject matter of any of examples 24-31, wherein the determination of the likelihood of the predicted trajectory is further based on historical information indicating how often pedestrians travel to a goal position of the predicted trajectory relative to other goal positions.

Example 33 may include the subject matter of any of examples 24-32, wherein the predicted trajectory of the pedestrian is based at least in part on an observed motion profile of the pedestrian.

Example 34 may include the subject matter of any of examples 24-33, wherein the predicted trajectory of the pedestrian is based at least in part on a state of a traffic light of an intersection.

It should be appreciated that the examples presented above are non-limiting examples provided merely for purposes of illustrating certain principles and features and not necessarily limiting or constraining the potential embodiments of the concepts described herein. For instance, a variety of different embodiments can be realized utilizing various combinations of the features and components described herein, including combinations realized through the various implementations of components described herein. Other implementations, features, and details should be appreciated from the contents of this Specification.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. In certain implementations, multitasking and parallel processing may be advantageous. Additionally, other user interface layouts and functionality can be supported. Other variations are within the scope of the following claims.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

What is claimed is:

1. An apparatus comprising:
    a memory to store a first observed trajectory and a second observed trajectory of a pedestrian, the first observed trajectory comprising a plurality of observed locations of the pedestrian over a first plurality of timesteps, the second observed trajectory comprising a plurality of observed locations of the pedestrian over a second plurality of timesteps, wherein the second plurality of timesteps includes the first plurality of timesteps and at least one additional subsequent timestep; and
    a processor coupled to the memory, the processor comprising circuitry, the processor to:
        generate a predicted trajectory of the pedestrian, the predicted trajectory comprising a plurality of predicted locations of the pedestrian over the second plurality of timesteps and over a third plurality of timesteps occurring after the second plurality of timesteps;
        determine a first likelihood of the predicted trajectory based on a comparison of the plurality of predicted locations of the pedestrian over the first plurality of timesteps and the plurality of observed locations of the pedestrian over the first plurality of timesteps;
        determine a second likelihood of the predicted trajectory based on a comparison of the plurality of predicted locations of the pedestrian over the second plurality of timesteps and the plurality of observed locations of the pedestrian over the second plurality of timesteps; and
        responsive to the first and/or second likelihood of the predicted trajectory, provide information associated with the predicted trajectory to a vehicle to warn the vehicle of a potential collision with the pedestrian.

2. The apparatus of claim 1, wherein the vehicle does not have a line of sight with the pedestrian when the information associated with the predicted trajectory is provided by the processor.

3. The apparatus of claim 1, wherein the information associated with the predicted trajectory comprises the predicted trajectory.

4. The apparatus of claim 1, wherein the processor is further to select the predicted trajectory from among a plurality of predicted trajectories for the pedestrian based on the determined likelihood of the predicted trajectory.

5. The apparatus of claim 1, wherein the comparison of the plurality of predicted locations of the pedestrian over the first plurality of timesteps and the plurality of observed locations of the pedestrian over the first plurality of timesteps comprises an evaluation of values of a plurality of gaussian distributions at the plurality of predicted locations of the pedestrian over the first plurality of timesteps, wherein the plurality of gaussian distributions have respective means at the plurality of observed locations of the pedestrian over the first plurality of timesteps.

6. The apparatus of claim 1, wherein the processor is further to generate a path from a start position to an inferred goal position of the pedestrian using random sampling and generate the predicted trajectory of the pedestrian based on the generated path.

7. The apparatus of claim 6, wherein the random sampling is generated utilizing a Rapidly-exploring Random Tree Star.

8. The apparatus of claim 1, wherein the processor is further to:
    determine locations of a plurality of obstacles of an intersection, an obstacle representing an area of the intersection that is not traversable by the pedestrian; and
    generate the predicted trajectory of the pedestrian based on the plurality of obstacles of the intersection.

9. The apparatus of claim 1, wherein the determination of the second likelihood of the predicted trajectory is further based on historical information indicating how often pedestrians travel to a goal position of the predicted trajectory relative to other goal positions.

10. The apparatus of claim 1, wherein the predicted trajectory of the pedestrian is based at least in part on an observed motion profile of the pedestrian.

11. The apparatus of claim 1, wherein the predicted trajectory of the pedestrian is based at least in part on a state of a traffic light of an intersection.

12. The apparatus of claim 1, further comprising one or more of a battery communicatively coupled to the processor, a display communicatively coupled to the processor, or a network interface communicatively coupled to the processor.

13. The apparatus of claim 1, wherein the processor is to generate a plurality of predicted trajectories of the pedestrian from a start position to an inferred goal position based on different assumed velocities or accelerations of the pedestrian, wherein the predicted trajectory is one of the plurality of predicted trajectories.

14. A method comprising:
storing first observed trajectory and a second observed trajectory of a pedestrian, the first observed trajectory comprising a plurality of observed locations of the pedestrian over a first plurality of timesteps, the second observed trajectory comprising a plurality of observed locations of the pedestrian over a second plurality of timesteps, wherein the second plurality of timesteps includes the first plurality of timesteps and at least one additional subsequent timestep;
generating a predicted trajectory of the pedestrian, the predicted trajectory comprising a plurality of predicted locations of the pedestrian over the second plurality of timesteps and over a third plurality of timesteps occurring after the second plurality of timesteps;
determining a first likelihood of the predicted trajectory based on a comparison of the plurality of predicted locations of the pedestrian over the first plurality of timesteps and the plurality of observed locations of the pedestrian over the first plurality of timesteps;
determining a second likelihood of the predicted trajectory based on a comparison of the plurality of predicted locations of the pedestrian over the second plurality of timesteps and the plurality of observed locations of the pedestrian over the second plurality of timesteps; and
responsive to the first and/or second likelihood of the predicted trajectory, providing information associated with the predicted trajectory to a vehicle to warn the vehicle of a potential collision with the pedestrian.

15. The method of claim 14, wherein the vehicle does not have a line of sight with the pedestrian when the information associated with the predicted trajectory is provided.

16. The method of claim 14, further comprising generating a path from a start position to an inferred goal position of the pedestrian using random sampling and generating the predicted trajectory of the pedestrian based on the generated path.

17. The method of claim 14, further comprising:
determining locations of a plurality of obstacles of an intersection, an obstacle representing an area of the intersection that is not traversable by the pedestrian; and
generating the predicted trajectory of the pedestrian based on the plurality of obstacles of the intersection.

18. At least one non-transitory machine readable storage medium having instructions stored thereon, the instructions when executed by a machine to cause the machine to:
store a first observed trajectory and a second observed trajectory of a pedestrian, the first observed trajectory comprising a plurality of observed locations of the pedestrian over a first plurality of timesteps, the second observed trajectory comprising a plurality of observed locations of the pedestrian over a second plurality of timesteps, wherein the second plurality of timesteps includes the first plurality of timesteps and at least one additional subsequent timestep;
generate a predicted trajectory of the pedestrian, the predicted trajectory comprising a plurality of predicted locations of the pedestrian over the second plurality of timesteps and over a third plurality of timesteps occurring after the second plurality of timesteps;
determine a first likelihood of the predicted trajectory based on a comparison of the plurality of predicted locations of the pedestrian over the first plurality of timesteps and the plurality of observed locations of the pedestrian over the first plurality of timesteps;
determine a second likelihood of the predicted trajectory based on a comparison of the plurality of predicted locations of the pedestrian over the second plurality of timesteps and the plurality of observed locations of the pedestrian over the second plurality of timesteps; and
responsive to the first and/or second likelihood of the predicted trajectory, provide information associated with the predicted trajectory to a vehicle to warn the vehicle of a potential collision with the pedestrian.

19. The at least one non-transitory machine readable storage medium of claim 18, wherein the vehicle does not have a line of sight with the pedestrian when the information associated with the predicted trajectory is provided.

20. The at least one non-transitory machine readable storage medium of claim 18, the instructions when executed by the machine to cause the machine to generate a path from a start position to an inferred goal position of the pedestrian using random sampling and generate the predicted trajectory of the pedestrian based on the generated path.

21. The at least one non-transitory machine readable storage medium of claim 18, the instructions when executed by the machine to cause the machine to:
determine locations of a plurality of obstacles of an intersection, an obstacle representing an area of the intersection that is not traversable by the pedestrian; and
generate the predicted trajectory of the pedestrian based on the plurality of obstacles of the intersection.

* * * * *